United States Patent [19]

Campbell et al.

[11] Patent Number: 4,536,791
[45] Date of Patent: Aug. 20, 1985

[54] ADDRESSABLE CABLE TELEVISION CONTROL SYSTEM WITH VIDEO FORMAT DATA TRANSMISSION

[75] Inventors: John G. Campbell, Irving; Carl F. Schoeneberger; Allan B. Bundens, both of Carrollton; Richard M. Fogle, Bedford; John R. Lemburg, Richardson, all of Tex.

[73] Assignee: Tocom, Inc., Dallas, Tex.

[21] Appl. No.: 617,137

[22] PCT Filed: Mar. 31, 1981

[86] PCT No.: PCT/US81/00414

§ 371 Date: Nov. 27, 1981

§ 102(e) Date: Nov. 27, 1981

[87] PCT Pub. No.: WO81/02961

PCT Pub. Date: Oct. 15, 1981

Related U.S. Application Data

[63] Continuation of Ser. No. 348,937, Nov. 27, 1981, abandoned, which is a continuation-in-part of Ser. No. 135,987, Mar. 31, 1980, abandoned.

[51] Int. Cl.$^3$ .......................... H04N 7/16; H04K 1/04
[52] U.S. Cl. .................................... 358/122; 358/114; 358/147; 358/259; 358/263
[58] Field of Search ............... 358/114, 147, 263, 259, 358/122

[56] References Cited

U.S. PATENT DOCUMENTS

| | | |
|---|---|---|
| 2,843,655 | 7/1958 | Gottfried et al. |
| 3,472,962 | 10/1969 | Sanford . |
| 3,668,307 | 6/1972 | Face et al. ............................ 358/114 |
| 3,899,633 | 8/1975 | Sorenson et al. |
| 3,916,091 | 10/1975 | Kirk, Jr. et al. |
| 3,919,462 | 11/1975 | Hartung et al. ...................... 358/124 |
| 4,068,264 | 1/1978 | Pires ..................................... 358/122 |
| 4,163,254 | 7/1979 | Block et al. .......................... 358/122 |
| 4,225,884 | 9/1980 | Block et al. .......................... 358/117 |
| 4,233,628 | 11/1980 | Ciciora ................................. 358/147 |

OTHER PUBLICATIONS

IEEE Transactions on Consumer electronics, vol. CE-25, No. 3, Jul. 1979.
L. Solomon, *Pop. Electronics*, May 1979, p. 49.

*Primary Examiner*—S. C. Buczinski
*Attorney, Agent, or Firm*—Hubbard, Thurman, Turner & Tucker

[57] ABSTRACT

An addressable cable television control system controls television program and data signal transmission from a central station to a plurality of user stations. The data signals include both control and text signals in video line format which are inserted on the vertical interval of the television signals, thereby freeing all channels for transmission of both television and data signals. Moreover, full-channel teletext data in video line format may be transmitted on dedicated text channels with the modification of only head end processors. An intelligent converter at each remote user location uses the data signals to control access to the system on the basis of channel, tier of service, special event and program subject matter. The converter uses a graphics display generator to generate display signals for the presentation of the text data on the television receiver and for the generation of predetermined messages for the viewer concerning access, emergencies and other functions. The converter processes vertical interval text data and selected full-channel text data, both transmitted in video line format. The keyboard of the subscriber provides a number of different functional inputs for the subscriber to interface with the system. The converter also includes apparatus for interfacing with two-way interactive data acquisition and control systems.

8 Claims, 19 Drawing Figures

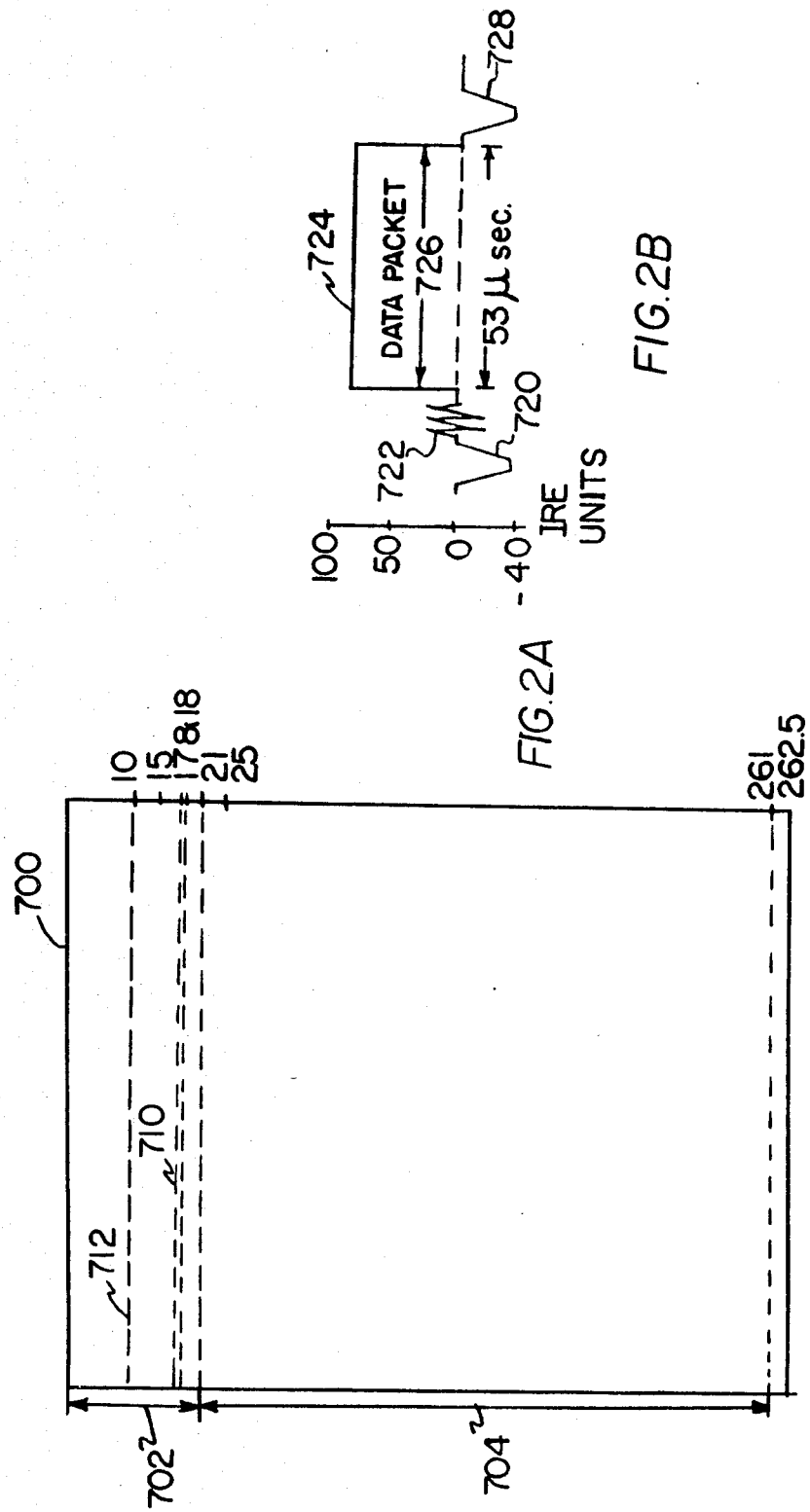

200 — CHANNEL CONTROL WORD

| CONTROL IDENTIFIER | TIER CODE | PROGRAM CODE | ELIGIBILITY CODE | DESCRAMBLING CODE |
|---|---|---|---|---|
| 201 | 202 | 204 | 206 | 208 |

210 — SUBSCRIBER ENABLE WORD

| ADDRESS IDENTIFIER | SUBSCRIBER ID CODE | CHANNEL ENABLE | TIER ENABLE | TEXT ENABLE |
|---|---|---|---|---|
| 212 | 214 | 216 | 218 | 219 |

220 — EVENT ENABLE WORD

| ADDRESS IDENTIFIER | SUBSCRIBER ID CODE | CHANNEL NUMBER | PROGRAM ENABLE |
|---|---|---|---|
| 222 | 224 | 226 | 228 |

230 — ELIGIBILITY WORD

| ADDRESS IDENTIFIER | SUBSCRIBER ID CODE | KEY NUMBER | ELIGIBILITY THRESHOLD CODE |
|---|---|---|---|
| 232 | 234 | 236 | 238 |

240 — EMERGENCY ALERT WORD

| ADDRESS IDENTIFIER | SUBSCRIBER ID CODE | EMERGENCY ALERT CODE |
|---|---|---|
| 242 | 244 | 246 |

250 — TEXT TRANSMISSION WORD

| TEXT IDENTIFIER | CHARACTER 1 | CHARACTER 2 | CHARACTER 3 | CHARACTER 4 |
|---|---|---|---|---|
| 252 | 254 | 255 | 256 | 257 |

FIG. 11

ADDRESSABLE CABLE TELEVISION CONTROL SYSTEM WITH VIDEO FORMAT DATA TRANSMISSION

CROSS REFERENCE TO RELATED APPLICATION

This application is a continuation of application Ser. No. 348,937, filed Nov. 27, 1981, now abandoned, which is a continuation-in-part application of U.S. application Ser. No. 135,987, filed Mar. 31, 1980, now abandoned.

BACKGROUND OF THE INVENTION

This invention relates to an addressable cable television control system. More particularly, the present invention relates to a cable television system having a multiple-function addressable converter and including data transmission in video format during the vertical interval of the video field or during substantially the entire video field.

In recent years, the availability of cable television programs and services for the general public has expanded rapidly. Communication satellites have enabled nationwide programming for a number of "super stations". Sophisticated two-way interactive cable communication systems have laid the groundwork for a wide spectrum of cable television and data communication services for the consuming public. After years of development, cable television systems have been or are now being installed in many major cities to provide the television consumer with a vast array of programming choices as well as many other services which can be utilized at home, such as shopping, banking and schooling. Other services provided by such systems include home security monitoring, medical and emergency alert signaling and information retrieval.

In order to provide these new services and programs in a systematic and efficient manner, generalized control systems are required which can supervise access to both one-way and two-way sophisticated cable communication systems having different degrees of complexity. Control is required to differentiate and limit access on several bases, including different levels or tiers of subscribers to different television channels, and different programs and events on a given channel. In addition, for many subscribers it is desirable to be able to limit access to certain programs because of the program subject matter. Presently, there are no cable systems having this degree of sophistication in controlling program access. Even simpler conventional cable systems which provide for limiting program access must be two-way interactive systems requiring more complex and expensive equipment than one-way systems.

Besides this problem of coordinating cable communications, the need for efficiency in the transmission of data has become increasingly apparent. Although approximately 55 video and sound channels are presently available between the allocated television frequencies of 50 and 400 megahertz, the varied types of possible cable television programming and data transmission services require the efficient utilization of these frequencies. For example, cable television programming includes movies, special events, news, consumer programming, community access and religious programming. An almost limitless range of data can be provided, including reports on stock and money markets, weather reports, airline schedules, shopping directories, entertainment schedules, traffic reports, home security data emergency and first aid information and unlimited library textual information. The possibility for cable system operators to lease available cable channels to private concerns for these and other services makes it imperative that cable transmission control be efficient and flexible. In order to effectively utilize the available portion of the electromagnetic spectrum for such a wide variety of programming and data transmission, the cable system should be able to process the data quickly and efficiently while using relatively simple and inexpensive equipment which is affordable to the general consuming public.

In the last few years, various experiments have been conducted regarding the transmission of data over the vertical blanking interval of a normal television signal. This interval in the video signal occurs 60 times each second as the cathode ray tube beam sweeps from the buttom to the top of the TV screen and is relatively unused for the transmission of data. Some early systems such as that shown in U.S. Pat. No. 3,769,579 issued Oct. 30, 1973, utilized the vertical interval for transmitting control signals to individual transponders at the subscriber locations. More recently, there has been experimentation with television broadcasting systems which transmit visual data on the vertical blanking interval, referred to as teletext transmission, for display as pages of text on suitably equipped television receivers. These experimental systems have generally been limited to over-the-air broadcasting of teletext transmissions for a single channel, and the necessary apparatus for cable television systems has been regarded as too complicated and expensive to be practical when compared to the high-speed transmission of compact data over a dedicated channel.

It is desirable in many instances to dedicate an entire television channel to the transmission of data rather than video signals. Prior art systems for dedicated data channels typically require special transmitters and receivers different from those used for the transmission of video signals in order to achieve the desired high baud (bits per second) rate to efficiently utilize the channel bandwidth. This special data transmission equipment has resulted in substantial cost and complexity, particularly at each remote user terminal where a different receiver is usually required for each dedicated data channel. A simple and inexpensive system for the high speed transmission of data on a dedicated data channel has been greatly needed.

SUMMARY OF THE INVENTION

The present invention provides a relatively inexpensive and simple cable television system having the capability of controlling access to a wide range of television program and data signals while efficiently transmitting data signals in a video format during the vertical interval (VI) of each television program channel. This VI data not only provides control data for an intelligent converter unit, but also provides a substantial amount of textual data per channel for use either to provide additional data to supplement a channel television program or as a separate all textual and graphic channel.

The present invention includes an intelligent addressable converter designed to convert and descramble video for up to 55 CATV channels. For dual cable systems, an optional cable switch on the converter doubles the available number to 110 channels. The converter of the present invention receives control data which allows the system operator to control subscription television services on a per channel, per service tier, and per event basis. In addition, the system and converter of the present invention enables each subscriber to define his own level of required eligibility based on program subject matter.

The system of the present invention also enables a complementary text channel to be transmitted on the vertical interval of each of the incoming video signals and to be decoded and displayed as an alternate channel to the video programming. The data for the complementary text channel is preferably displayed in a combination of text and graphics. This capability effectively adds 55 additional text channels for a wide spectrum of data-type information for the consumer. Thus, the present system provides 110 independent channels of television program and text viewing in a one cable system and 220 channels in two cable systems. Moreover the control system of the present invention, when used in conjunction with appropriate two-way interactive apparatus, provides a complete two-way interactive communication system including pay-per-view, home security, opinion polling, channel monitoring, information retrieval, and with additional equipment, energy management.

Moreover, the present invention provides a relatively inexpensive and simple cable communication system having the capability of transmitting data signals in a video format over substantially the entire video field of selected television program channels. By transmitting data in the video format over these dedicated data channels, the present invention minimizes the need for special additional expensive equipment, particularly special data receiver equipment for each converter unit. Rather, each addressable converter of the present invention is readily adapted to receiving selected lines of data transmitted in video format without requiring additional expensive receiver equipment.

For a better understanding of the present invention, together with other and further objects and features thereof, reference is made to the following description taken in connection with the accompanying drawings.

BRIEF DESCRIPTION OF THE DRAWINGS

FIG. 2A is a diagram showing the line layout of a video field according to the present invention;

FIG. 2B is a time-based diagram showing the video line format of data transmission in accordance with the present invention;

FIG. 11 is a schematic diagram showing the data format for the system of the present invention;

DETAILED DESCRIPTION

Figure 1:
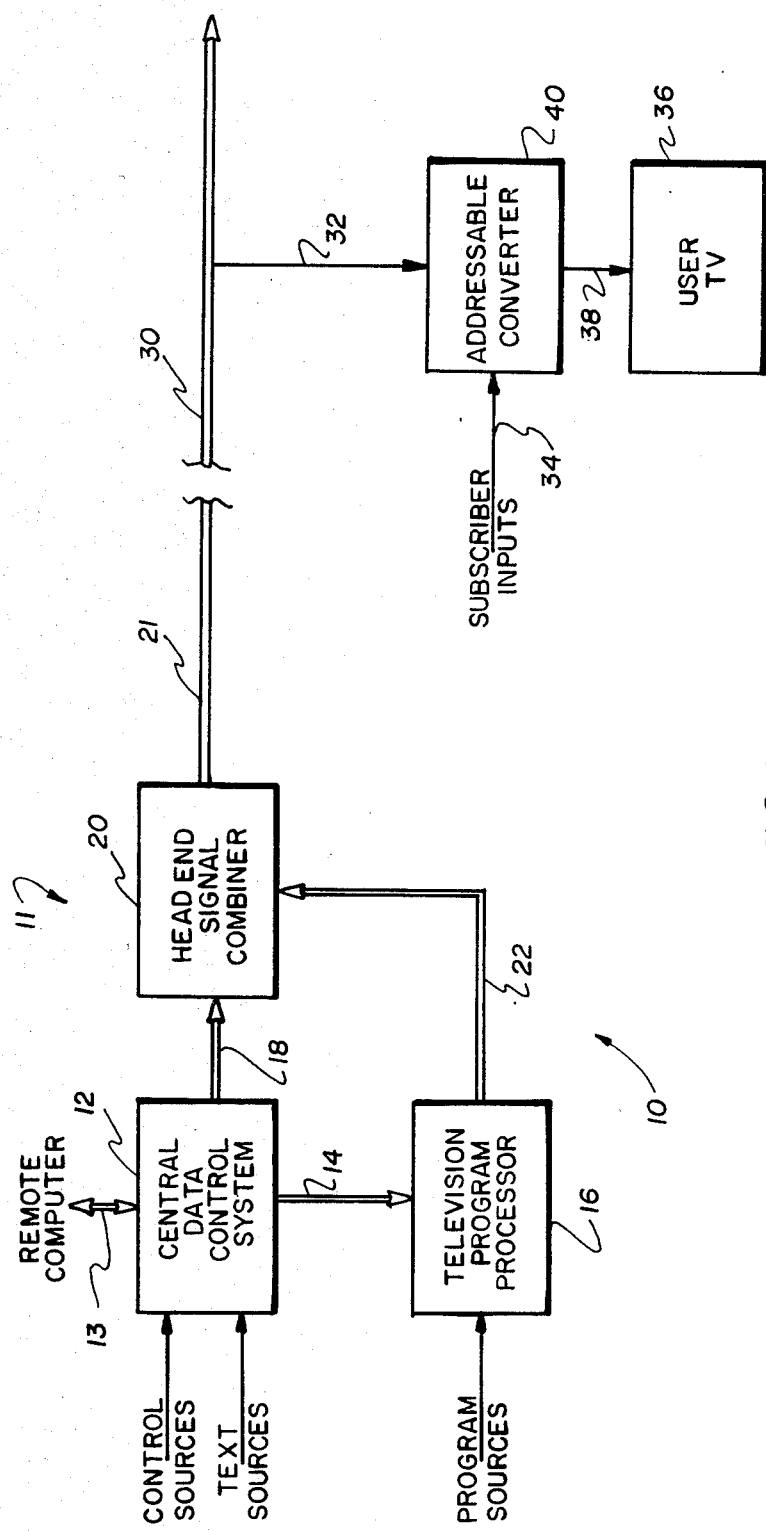
FIG. 1 is a simplified block diagram of a preferred embodiment of the addressable cable television control system of the present invention.

FIG. 1 shows a simplified block diagram of a one-way cable television system 10 in accordance with the present invention. A head end station 11 includes a central data system 12 utilizing a control computer which gathers data from a wide variety of sources and formats the data for transmission on video frequency channels. The central data control system preferably has a two-way interface link 13 with a remote computer which may be used for central control and billing functions. The formatted data is then transmitted by communications link 14 to a television program processor 16 where it is incorporated into the vertical blanking intervals of video signals generated by a variety of television program sources. In addition, the data may be formatted for transmission in a separate channel dedicated only for the transmission of data. The dedicated data channel transmissions are connected over link 18 to a head end signal combiner 20 where they are combined with a plurality of video signals transmitted from television program systems 16 along transmission link 22. The head end unit then transmits the combined cable television and data signal to remote subscribers. Normally, the signals are then transmitted through a cable network, referred to as a cable plant to a plurality of subscribers.

FIG. 1 shows a single cable plant 30 servicing a plurality of cable television subscribers by way of a one-way data link 32. The transmitted signals are received by an addressable converter 40 on a one-way data bus 32. Converter 40 then processes the data on line 38 as determined by subscriber input 34 for desired viewing on one or more television sets 36.

Figure 2:
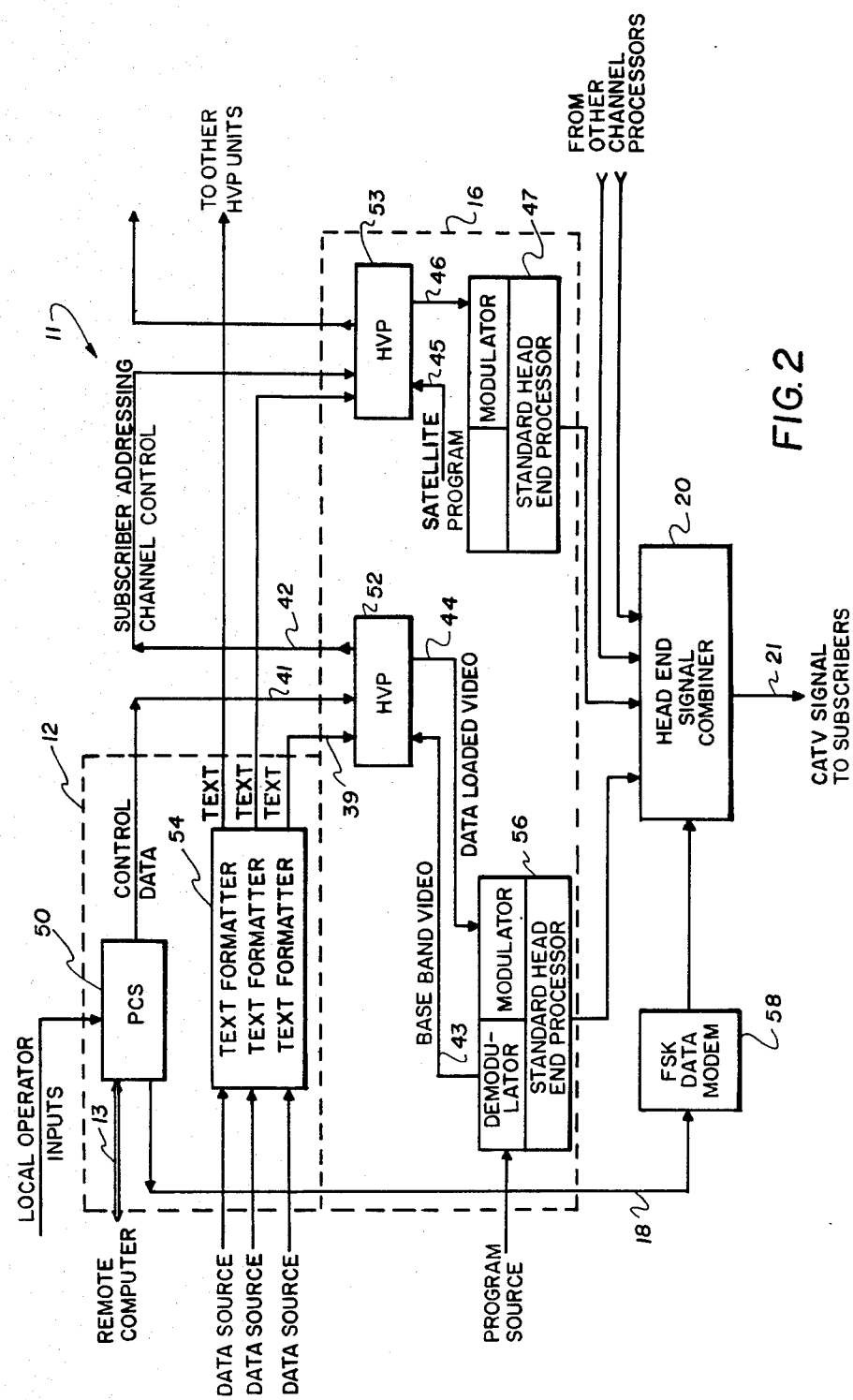
FIG. 2 is a block diagram of a preferred embodiment of the head end portion of the system shown in FIG. 1.

Referring now to FIG. 2, one preferred embodiment of the data control system 12 and television program processor 16 is shown in greater detail. This preferred embodiment which is shown in FIGS. 2 through 12 concerns a system which transmits data in the vertical interval of each video field. Another preferred embodiment disclosing a full-channel data transmission system using a video format will be discussed thereafter.

As shown in FIG. 2, a programming control system (PCS) 50 generates a continuous stream of data that contains a mixture of subscriber addressing signals and channel control signals. This data is transmitted to a plurality of head end video processors (HVP) 52 and 53 for combining with video signals in a plurality of different channel frequencies. PCS 50 is also preferably connected by a two-way data link to a remote computer for use in various control functions.

A text formatter system 54 receives data from a wide variety of sources such as weather, news, stock and others which are formatted for video transmission and then selectively transmitted in text form to the plurality of HVP units 52, 53. The text formatter system 54 preferably is comprised of a plurality of text formatters, each processing data from a text or graphics source. A variety of manufacturers produce equipment for cable television digital channels which are easily adaptable to the present system. One source of suitable conventional formatters is Video Data Systems, Happaque, L.I., N.Y.

Video signals are generated for input to each HVP unit by conventional sources, either from local video input sources as shown for HVP unit 52 or satellite video input sources for HVP unit 53. In either case, the signals are processed by a conventional channel processor 56 having modulator and demodulator units and a standard head end processor. Each television channel is preferably processed at base band video for purposes to be explained later.

The subscriber addressing and channel control data from PCS 50 is input to HVP 52 on line 41 where it is inserted in the vertical interval of the video signal. The channel control data from PCS 50 is processed at HVP 52 to generate scrambler signals, program identification signals, tier signals and eligibility code signals as will be discussed later. These signals are utilized by each subscriber's addressable converter 40 to determine the particular subscriber's authorization to receive each program and to control descrambling of the video signals.

One of the text signals from text formatter 54 is also input to HVP 52 on line 39 to be inserted into the vertical interval of the video signal. Preferably, a different type of textual data are inserted into the vertical interval of each video channel so that a complementary text channel may be selected by each remote subscriber.

HVP unit 52 then routes the base band-video output with vertical interval data on line 44 to a standard head end modulator and processor in processing unit 56. From there, the signal is sent to master head end unit 20 where it is combined with signals from other channel processors to provide the total multiple channel CATV signal for output on line 21 to the cable plant. An FSK data modulator 58 is connected directly between PCS 50 and head end signal combiner 20 by line 18 for transmission of data on dedicated data channels.

In order to understand how a data signal is transmitted on the vertical interval of a television program signal, the vertical interval of a conventional television signal will be described. Referring to FIG. 2A, each television signal is made up of a series of "lines" each of which represent the length of time required for the cathode ray tube of the television set to make one horizontal sweep across the screen. The number of horizontal lines required to cover the screen is called a field 700, and there are two interlocking fields, both having 262.5 lines which together form a frame. In conventional systems, 30 frames are transmitted each second to make up the television picture. Each time the cathode ray tube reaches the bottom of the screen it must sweep diagonally upward to the top of the screen to begin a new field. This time period 702 is referred to as the "vertical blanking interval" or simply "vertical interval" and is normally approximately 21 lines in length. The television picture 704 begins at about line 21 and extends to about line 261, but normally the picture is viewable on most television sets only between about lines 25 and 255.

Although no television picture data is transmitted during the vertical interval, the television industry has provided for a number of different types of control transmission on certain lines of the interval. In most cases, the first nine lines of the vertical interval are used for equalizing and for vertical synchronization. Lines 10 to 14 are normally at black level to minimize picture interference on some sets. Thus, only lines 15 to 21 are available for data transmission. Lines 15 and 16 have already been utilized at least experimentally for other purposes. Lines 19–21 are normally used for network control information for transmission to the receiver sets.

Thus, lines 17 and 18 are the only ones which are presently available for vertical interval data transmission 710 using the invention of the present system. These two lines normally contain network testing data to determine proper reception by the head end system. Once the television signals have been received, lines 17 and 18 can be cleared for passing data to the converters using the present invention. It should be understood that if additional lines in the vertical interval are cleared in the future, they could also be used for data transmission in accordance with the present invention.

Preferably, the present invention uses lines 17 and 18 of the vertical interval to transmit both the text data and the subscriber address and channel control data. In one field of a given frame lines 17 and 18 are used to transmit text data, and in the other frame field, the subscriber address and channel control data is projected on lines 17 and 18. The present invention also uses line 10 which is at the black "zero" voltage level of each vertical interval for a DC reference level 712 for the data signals. This reference signal passes to the converter as part of the vertical interval where it is used as a reference level for data extraction. This procedure greatly enhances the accuracy of the data transmission by automatically compensating for any DC level shift in the vertical interval portion of the television signal.

Using the procedure described above an effective text character transfer rate of about 240 characters per second is achieved. This is a relatively slow rate compared to some other methods of data transmission. However, since the text may be transmitted over all 55 television program channels the total text available to the user is very substantial. Moreover, as previously mentioned, the present invention may include one or more dedicated channels for only text data transmission using the "line" or video format which will be described more fully in FIGS. 2B and 11. By using most of the 525 lines of each television signal frame for text data transmission a vast quantity of text can be transmitted and received on a given channel using the transmitting and receiving apparatus of the present system. No special expensive data transmission or receiving equipment is required.

A better understanding of the line or video format of the data used in the present invention may be obtained by reference to FIG. 2B, which shows a standard timing diagram for a single television line of the type shown in FIG. 2A. This is a standard video line format in accordance with FCC or NTSC requirements. The amplitude of the video signal is measured in standard IRE units.

As shown in the figure, the video signal begins with a negative horizontal sync pulse 720 of about 40 IRE units. This pulse establishes the beginning point of the horizontal sweep of the cathode ray tube across the screen. Next, a color burst oscillating pulse 722 occurs which is normally used to synchronize color decoding circuitry in a television receiver.

Data is encoded in the video scan line 724 following the color burst signal 722 as shown in FIG. 2B. This line is normally composed of 92 bit intervals with each bit being identified as "1" with an amplitude level of 50 to 80 IRE units or "0", carrying an amplitude of approximately zero IRE units. In this manner, the standard analog video signal is replaced by a binary digital data packet 726 of 92 bits which is transmitted together with the horizontal sync pulse and color burst pulse, both of which are analog signals.

Figure 3:
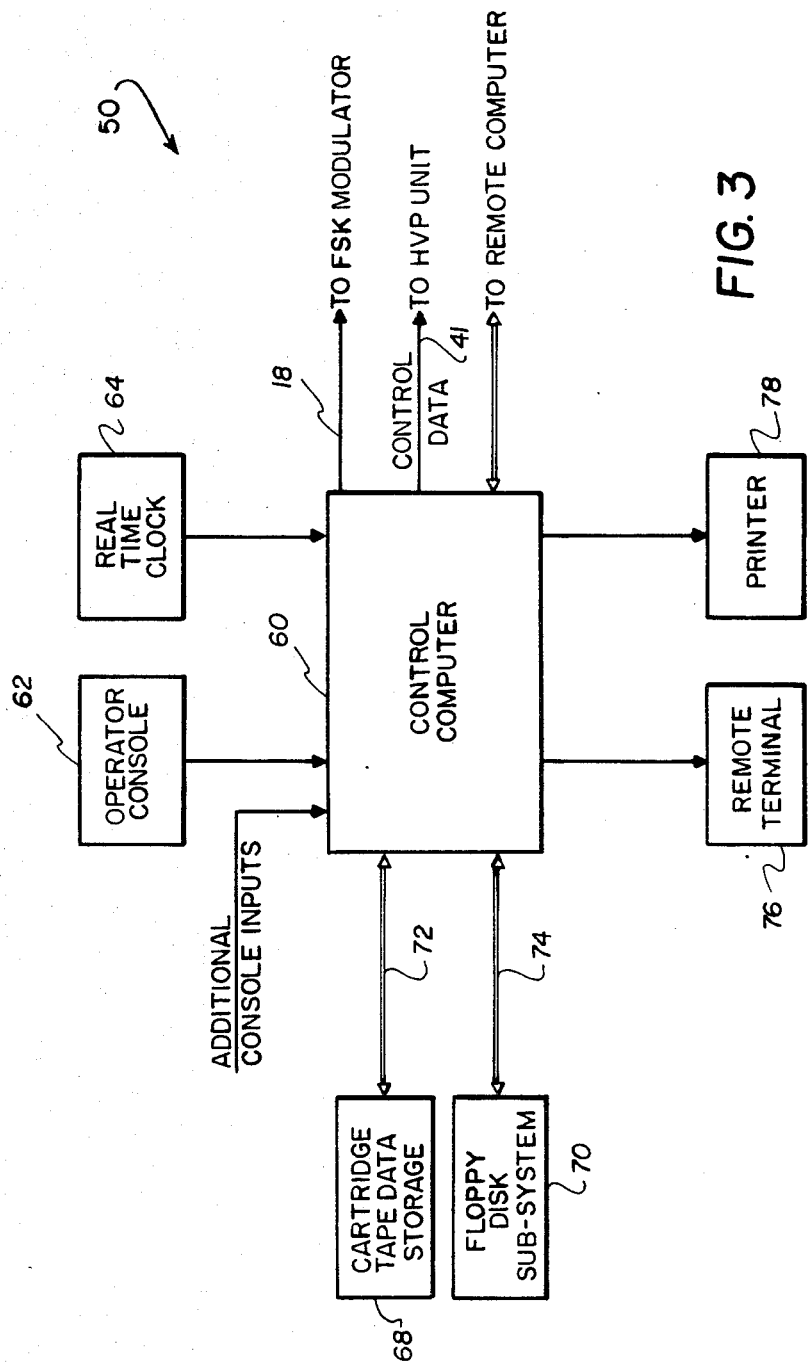
FIG. 3 is a block diagram of the programming control system shown in FIG. 2.

Looking now at FIG. 3, the programming control system 50 is shown in greater detail. The heart of PCS 50 is a sophisticated control computer, having both a random access memory and a read-only memory. Computer 60 is preferably a conventional general purpose minicomputer utilizing a central data system. Computer 60 may be controlled by a conventional system operator console 62, a real time clock 64 and external data links 66 including a two-way interface with another remote computer for central control. Control computer 60 is also connected to magnetic storage devices such as a cartridge tape data storage unit 68 and a floppy disk subsystem 70 communicating with control computer 60 over two-way data links 72 and 74 respectively. Other outputs to conventional units such as remote terminal 76 and printer 78 are optional.

One preferred embodiment of control computer 60 comprises a rack-mounted Hewlett-Packard 1000 minicomputer system having standard operating system software. The computer may also include application programs allowing it to interface with two-way data acquisition and control systems. This interface is preferably carried out by communications with the home terminal shown in FIG. 10.

Figure 4:
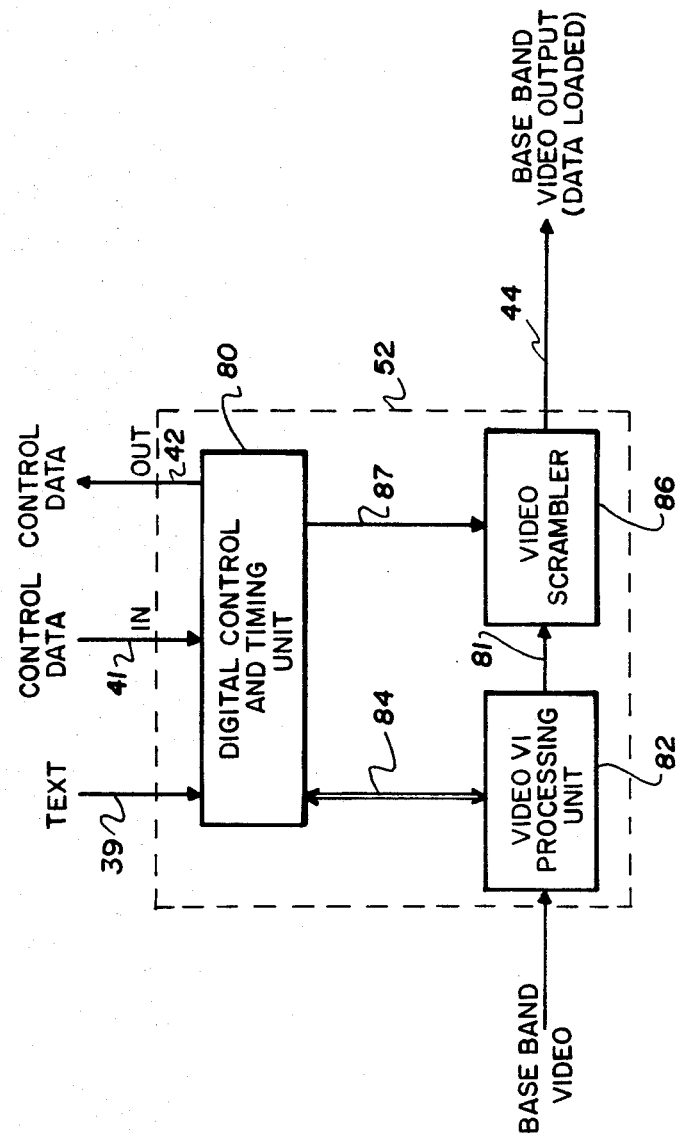
FIG. 4 is a block diagram of the head end video processor shown in FIG. 2.

The head end video processor unit 52 of FIG. 2 is shown in more detail in FIG. 4. A digital control and timing unit 80 receives the text data from text formatter 54 on line 39 and the subscriber addressing and channel control data from PCS 50 on line 41 and processes it for insertion in the vertical interval of the video channels. The data on line 41 loops through unit 80 and back out on line 42 to the next digital control and timing unit. The base band viedo signal is input on line 43 to a video vertical interval processing unit 82 where it is processed for insertion of the subscriber addressing and channel control data from unit 80 via two-way data link 84. As previously described, the data is preferably inserted on two lines of each vertical interval and then directed to a conventional video scrambler 86. The resulting video signal which has been loaded with data and scrambled is then connected to the standard head-end processor 56 shown in FIG. 2.

Figure 5:
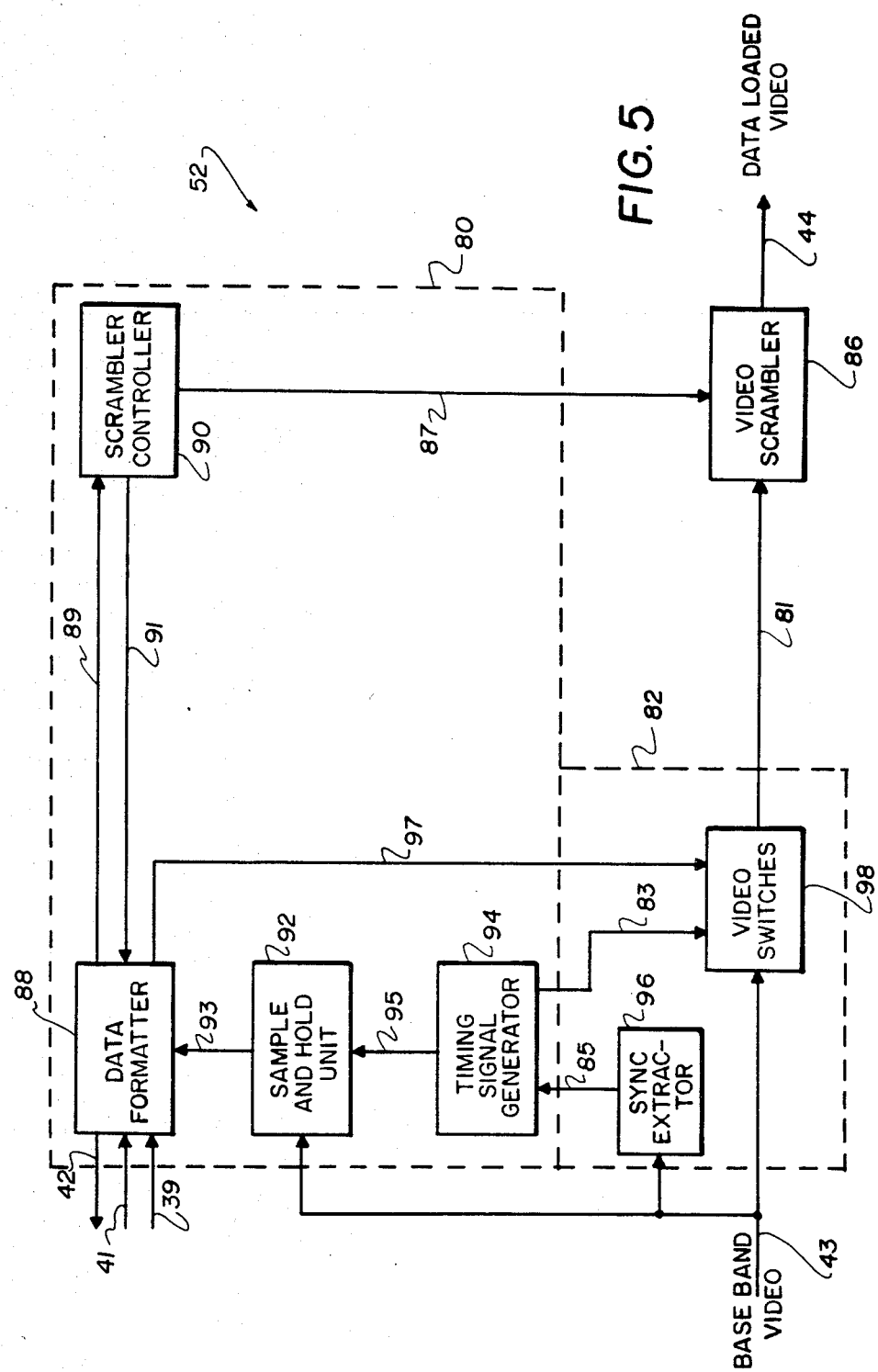
FIG. 5 is a more detailed block diagram of the head end video processor of FIG. 4.

Referring now to FIG. 5, the head end video processor 52 is shown in even greater detail. The digital control and timing unit 80 includes a data formatter 88, a scrambler controller 90, a sample and hold unit 92 and a timing signal generator 94. The video vertical interval processing unit 82 includes a sync extractor 96 and a video switch unit 98.

The video signal is input on line 43 to the sample and hold unit 92, the sync extractor 96 and the video switches 98. The text data is input to the data formatter 88 on line 39 and the subscriber and control data is input on line 41 to data formatter 88 and output on line 42. The sync extractor unit 96 divides out the horizontal and vertical sync signals from the video signal and directs them to the timing signal generator on line 85. Timing signal generator 94 counts the lines of the vertical interval of each field and outputs enabling signals at the appropriate time.

A reference enable signal is output to sample and hold unit 92 on line 95 when "line 10" in each vertical interval is detected representing the black "zero" level which is used as the DC reference level. The sample and hold unit then outputs a DC reference signal on line 93 to the data formatter so that the incoming data or text can be properly positioned relative to "line 10" of the vertical interval. The properly formatted data is then output to video switches 98 to await transmission at the proper time in the vertical interval.

When timing signal generator 94 reaches "line 17" in the vertical interval, a data enable signal is output on line 83 to the video switches 98. Upon receipt of the data enable signal, video switches 98 turn off the video input and turn on the data input which is passed through on line 81 to the video scrambler unit 86. At the same time, a scramble disable timing signal is transmitted from data formatter 88 on line 89 to the scrambler controller 90 which in turn outputs a scramble disable signal on line 87. This signal enables the data on line 81 to pass through the video scrambler and out on line 44 without being scrambled. When timing signal generator detects the end of "line 18" of the vertical interval, a data disable signal is directed via line 83 to the video switches 98 which turn off the data line and turns on the video line. At the same time, a scramble enable timing signal is directed on line 89 to the scrambler controller which transmits a scramble enable signal to the video scrambler via line 87. This signal enables video scrambler 86 so that the video signals coming in on line 81 will be scrambled before being transmitted on line 44.

It should also be noted that scrambler controller unit 90 outputs a scramble/descramble timing signal on line 91 to the data formatter 88. This signal is added to the data which is sent to video switches 98 for transmission. This signal is utilized by the converter 40 as will be discussed later to control the descrambling of the video signal at the converter.

Figure 6:
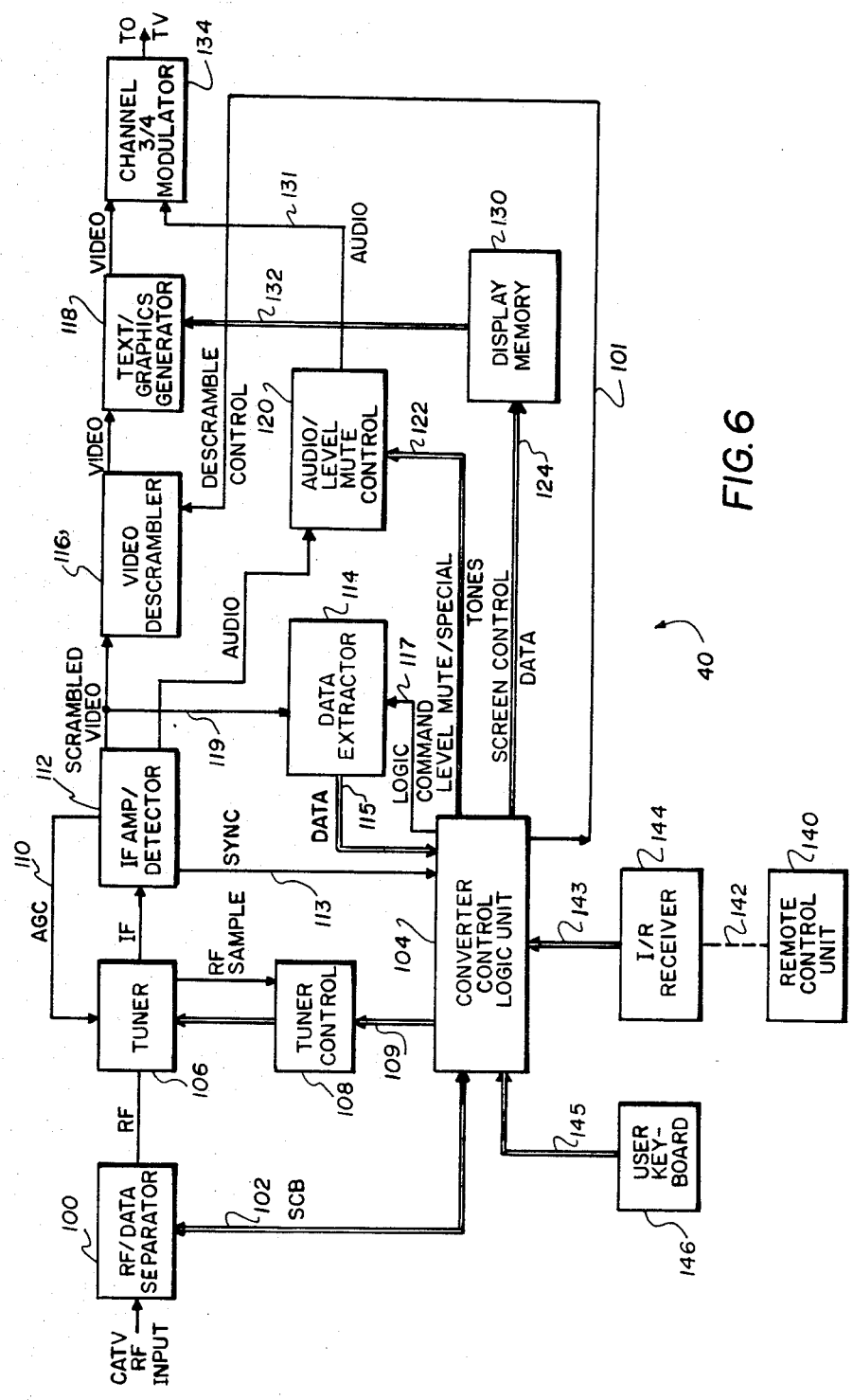
FIG. 6 is a block diagram of a preferred embodiment of the addressable converter of the present invention shown in FIG. 1.

Referring now to FIG. 6, the addressable converter unit 40 of FIG. 1 is shown in greater detail. The converter, under direction of converter control logic, processes the RF data-loaded television signals from combined video output line 21 of head end signal combiner 20 and provides video and audio output for a television set, preferably on channels 3 or 4. In a two-way interactive system the RF input to the converter 40 also includes data from a two-way home terminal as will be shown and discussed in connection with FIG. 10. Both types of signals are input to an RF/data separator 100 which directs the subscriber control data to a converter control logic 104 on SCB line 102. The RF data-loaded television signals are input to a conventional tuner 106 under the control of a tuner control unit 108 which in turn receives instructions from converter control logic 104.

Tuner 106 is preferably a conventional unit using a sliding band pass filter and a band switched front end that is tuned with phase lock loop control. The RF output signals are detected by an IF/amp detector 112 to provide a scrambled base-band video signal and a separate audio signal. Two-stage automatic gain control on feedback line 110 is provided to optimize noise reduction.

A data extractor 114 is connected to the scrambled video output of unit 112. Extractor 114 will be referred to as a vertical interval data extractor in discussing this embodiment and will be called a data extractor in discussing the full-channel teletext embodiment. Vertical interval data extractor 114 provides a serial data stream extracted from the vertical interval of the scrambled video signal to the converter control logic 104. A logic command signal for timing control is transmitted to extractor 114 by logic 104 on line 117. IF amp detector unit also generated a syncronizing signal from the video signal which is transmitted to logic 104 on line 113.

A conventional video descrambler unit 116 processes the scrambled base-band video signal from the tuner and provides a descrambled base band video signal which is directed to a text/graphics generator 118. The scramble/descramble timing signal generated by the scrambler controller 90 of HVP unit 52 and transmitted to converter 40 as part of the control data is processed by converter control logic 40 and input on line 101 to the video descrambler 116 to control is operation. The channel sound information is amplitude adjusted or muted by an audio level/mute control unit 120 controlled by a signal on data line 122 from logic 104.

The text/graphics generator 118 provides display characters and graphic symbols that have been transmitted on the vertical interval. The converter control logic 104 directs screen control data on data link 124 to a display memory 130 which in turn sends the formatted display characters along data link 132 to the text/graphics generator 118 for display.

The text/graphics generator 118 includes a plurality of video switches which are used to bypass the text/graphics generator with the channel video. Optionally the video switches also permit the channel number display to be superimposed on the video signal of the channel which is being presented. The output of generator 118 is connected to a channel 3 or 4 modulator 134 which in turn is connected to a subscriber's television set.

Preferably the subscriber's television set is plugged into a power control outlet on the addressable converter 40 which is enabled on command from a user keyboard unit 146 connected to converter control logic 104. All manual user inputs required by the system are preferably keyed in on keyboard 146. Alternately, the user may provide inputs from a remote control unit 140 having a keyboard similar to user keyboard 146. Data is preferably sent from remote control unit 140 via an infra-red wireless link 142 to a conventional I/R receiver 144 which is connected to converter control logic 104. Hence, logic 104 receives input data from the vertical interval data extractor 114 and from the subscriber via the keyboard 146 or the remote control unit 140. In two-way cable systems input is also received from the subscriber control bus 102. Converter control logic 104 processes this information and operates the various modules in converter 40 under program control.

Figure 7:
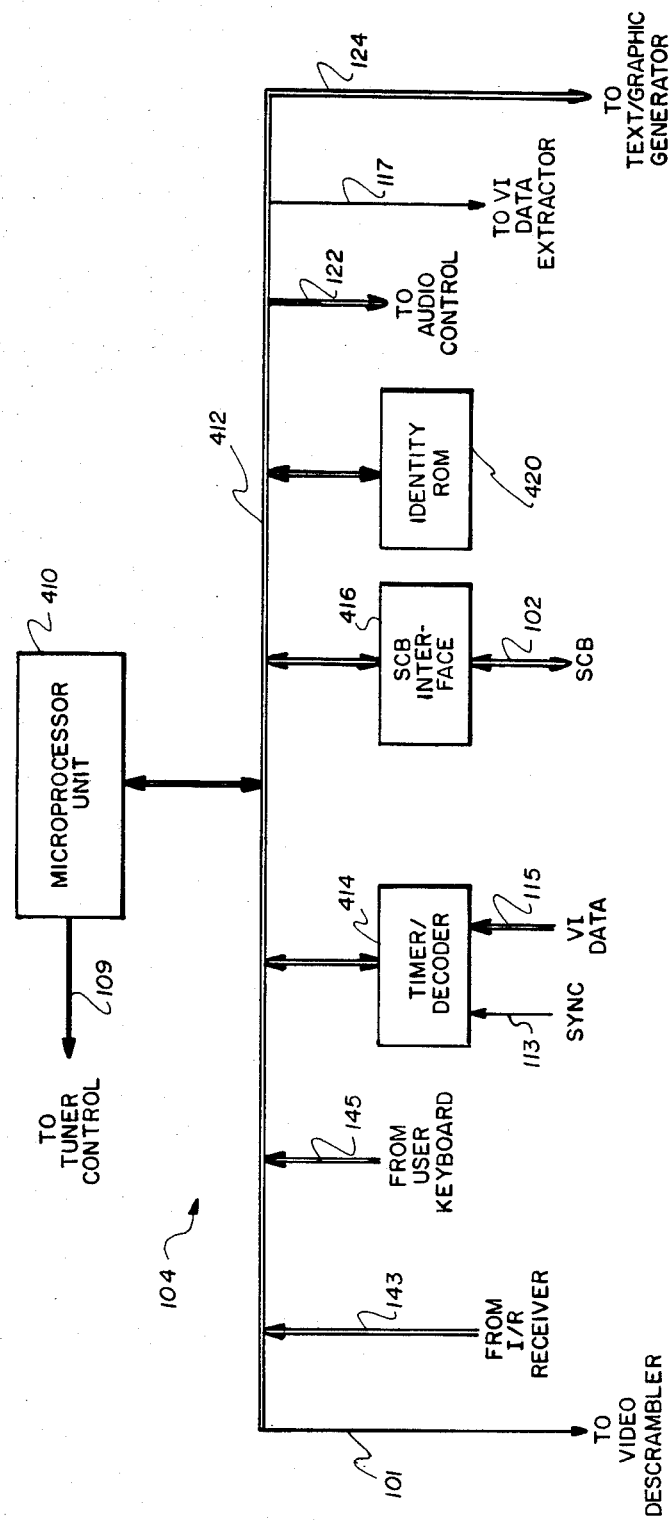
FIG. 7 is a block diagram of the converter control logic shown in FIG. 6.

Referring now to FIG. 7, converter control logic 104 is shown in greater detail. The central control logic 104 is carried out by a microprocessor unit 410. Microprocessor 410 is preferably a single microprocessor chip containing a random access memory, a read-only memory and timer. Unit 410 interfaces between the tuner control circuit 108 of converter 40 and a two-way data link 412 connecting it to the rest of the converter control logic.

A timer decoder unit 414 is connected to bus 412 and receives data from the vertical interval data extractor 114 on line 115. The VI data is buffered and decoded by unit 414 preparatory to being transmitted to microprocesor 410. In addition, timer decoder unit 414 receives sync pulses from IF amp/detector 112 on line 113. Unit 414 includes line counting logic for determining when data is to be received on the vertical interval.

Figures 9, 10:
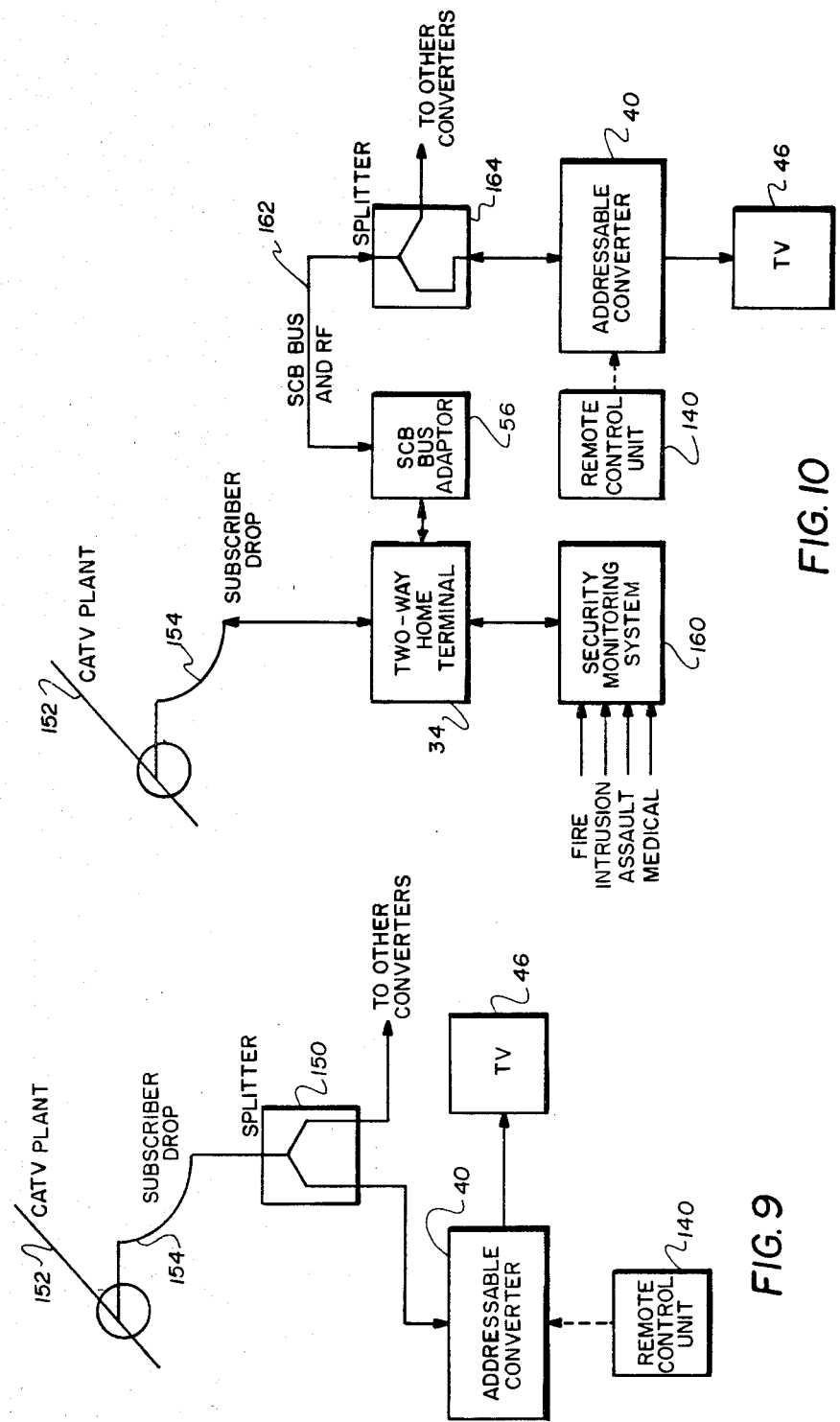
FIGS. 9 and 10 are schematic diagrams showing two preferred methods of connecting the converter of FIG. 6 in a CATV system.

A subscriber control bus (SCB) interface unit 416 receives incoming data from subscriber control bus 102 related to the functions of a two-way home terminal such as home terminal shown in FIG. 10. This SCB data is processed by interface unit 416 to be transmitted to microprocessor 410.

An identity ROM 420 is also connected by way of data link 412 to microprocessor 410. ROM 420 preferably contains a number of data codes which do not require changing in the normal operation of the system and which uniquely identify converter 40. These data codes include the identification number of the converter, the frequency configuration acceptable for the converter, and the "home channel" number, that is the channel number to which the converter will be tuned in the event of an emergency alert signal.

Preferably units 410, 414, 416 and 420 are all conventional integrated circuit chips readily available in the marketplace. Suitable chips for microprocessor 410 and timer decoder unit 414 are chip numbers 8048 and 8041 respectively, both manufactured by Intel Corporation. A suitable chip for SCB interface unit 416 is UART chip 6402 manufactured by Intersil Corporation. The identity ROM 420 is preferably a TI chip 74288, which is a 32 by 8 program read-only memory manufactured by Texas Instruments.

Figure 8:
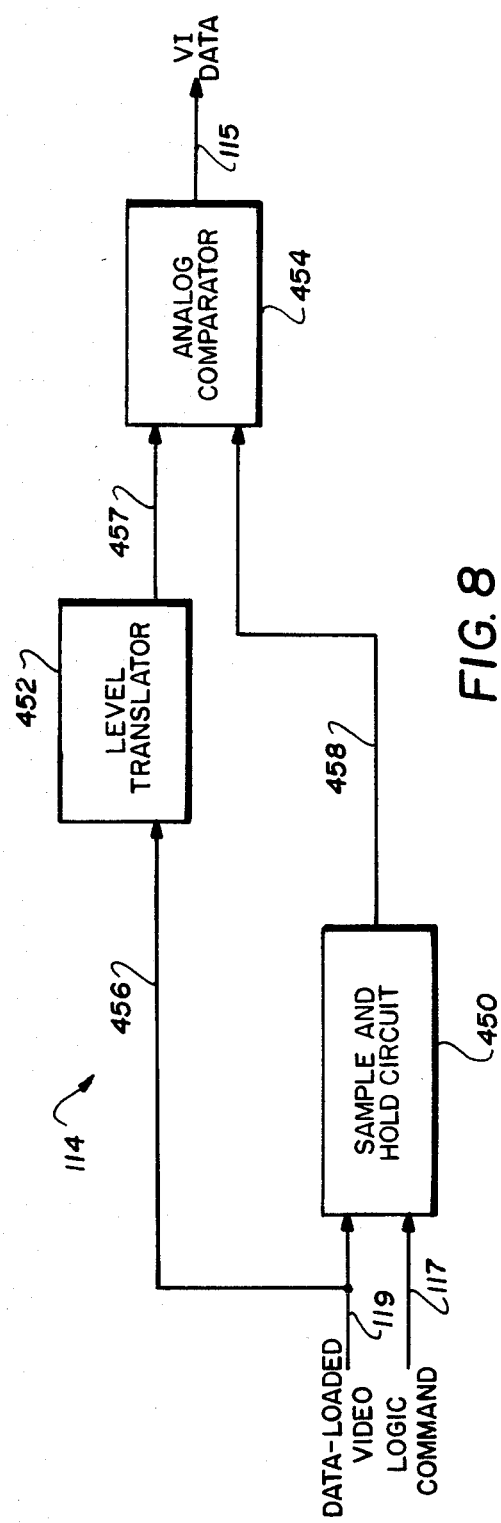
FIG. 8 is a block diagram of the VI data extractor unit shown in FIG. 6.

Referring now to FIG. 8, the vertical interval data extractor 114 is shown in greater detail. Extractor 114 comprises three interconnected units, namely a sample and hold circuit 450, a level translator 452 and an analog comparator unit 454. The sample and hold circuit 450 and the level translator 452 both receive the scrambled video input on line 119 from the IF amp/detector 112. The sample and hold circuit 450 also receives a logic command input on line 117 from converter control logic 104. The outputs of both sample and hold circuit 450 and level translator 452 are fed to the analog comparator unit 454 which in turn provides a digital data output to the converter control logic 104.

The digital data is transmitted from the head end processor in the vertical interval of the television signal as two discrete voltage levels, a digital "zero" being equivalent to the black level of the video signal and a digital "one" being equivalent to the 50 IRE units above the black level. In order to properly decode this data the black level must first be referenced. As was previously mentioned, the black level is established by sampling "line 10" of the vertical interval which is always transmitted as "zero" IRE level. The logic command signal on line 117 enables sample and hold circuit 450 when "line 10" is reached. Circuit 450 then samples the video level at that time which is at the black level, and this DC level is stored in sample and hold circuit 450 for the remainder of the vertical interval.

The video signal is also input on line 456 to level translator 452 which shifts the video pulses downward by 25 IRE units so that the black level will be positioned approximately half way up the height of the pulses.

Level translator 452 then feeds the pulses on line 457 to analog comparator unit 454. The DC level is input from sample and hold circuit 450 on line 458 to analog comparator unit 454. When the video signal level is above the 25 IRE unit level established by level translator 452, a logic "one" will appear on the digital output of analog comparator 454. When the video signal is below the present level established by level translator 452, a logic "zero" will appear on the digital data output of analog comparator 452.

By using the foregoing circuitry, the vertical interval data is removed from the scrambled video television signal with a high degree of accuracy. Both the data injection and data extraction processes are referenced from a common zero line which is transmitted as part of the vertical interval. Preferably the reference level is the black level line of each vertical interval. Thus, any shift in the DC level of the data signals from one vertical interval to the next will not affect the accuracy of data extraction, since each vertical interval includes its own reference point, namely the black level. Alternatively, other DC levels in the vertical interval could also be used for establishing a base reference for the data.

With reference now to FIGS. 9 and 10, addressable converter 40 is shown in two different configurations for subscriber usage. In FIG. 9, addressable converter 40 is connected in a stand alone, one-way configuration between a conventional RF splitter unit 150 and the subscriber's television set 46. This configuration is similar to that shown in FIG. 1. The RF signals from a cable TV plant 152 are transmitted by way of a subscriber drop 154 to splitter 150 where they are separated and sent to a plurality of addressable converters such as unit 40. The remote control unit 140 for remote usage by a subscriber in controlling converter 40 is optional.

In FIG. 10, addressable converter 40 is shown in an expanded system including a two-way security monitoring system 160. In this configuration, the RF signals from the CATV plant 152 are connected by way of a subscriber drop 154 to a two-way home terminal unit 34 which permits various accessor devices such as security monitoring system 160 to be controlled by a separate conventional two-way interactive data communications system (not shown) using cable plant 152. The converter 40 is connected to home terminal 34 by a subscriber control bus (SCB) 162 via SCB adapter 56. SCB bus 162 connects to the internal SCB bus 102 of converte 40 as shown in FIG. 6. The SCB bus 162 preferably carries downstream RF cable television signals and two-way data signals over a single coaxial cable link 162 connected to the addressable converter 40. Additional converters may be connected by way of a two or four-way splitter 164 that has been modified to pass DC signals.

In this expanded configuration, addressable converter unit 40 is enabled to "talk back" to the two-way interactive data communications system by way of the subscriber control bus adapter 156 and the two-way home terminal 34. The two-way home terminal 34 is also connected to the security monitoring system 160 to perform a wide variety of security functions including monitoring fire, intrusion, assault and medical emergencies. One preferable unit for home terminal 34 is terminal model 3-B made by Tocom, Inc., of Dallas, Tx.

The system of the present invention provides for several different procedures to restrict access to the television programming, including restrictions on the basis of addressable tiers, special events and eligibility codes. These different types of access control are all effected by a one-way system of the present invention using an intelligent converter at each subscriber location which can compare program codes sent from the head end station identifying each television program to user codes sent from the head end station identifying the access parameters of each subscriber. Preferably each converter on the cable system has its own individual identification number. All television channels are preferably scrambled by HVP unit 52 at the head end and descrambled by video descrambler unit 116 in converter 40. The descrambling process at the converter is enabled only after the proper control parameters are satisfied by the converter. For tiered program control, the channel control signals from the control data system program the addressable converter to compare each program tier code with the tier code of the subscriber. Thus, the remote subscribers can have access to different tiers of service regardless of the channel selected depending upon the type of service subscribed to by each user. This capability allows many different programs to be transmitted on a given channel while discriminating between subscribers who may view a given program.

The system of the present invention also provides for restricting access to specific programs, such as special events. Access is enabled by the converter if the subscriber has placed an order in advance for the program and the authorization is transmitted the converter by the data control system at the head end. Thus, this type of control enables the subscriber to have access to a given channel at a specific time.

With respect to eligibility control, the system of the present invention allows each subscriber to choose an eligibility level at which he would like to restrict access to incoming programs. Preferably each channel that is not showing general audience programs will contain an eligibility code for each program that defines a code representative of the subject matter of the program in question. These codes can be assigned on any basis including local community standards or national movie rating codes. This feature allows families with young children to control access to all movies having unsuitable subject matter. Eligibility codes may also be used for closed circuit government or corporate systems in which transmitted programs may require different levels of security classification.

In addition to the foregoing access control procedures, one-way cable system using the present invention can be programmed to recognize special emergency alert commands directed to all or selected units at any time. Through this means, it is possible to address selected groups such as city officials, police, firemen, national guard and so forth for emergency announcements at any time of the day or night.

Reference is now made to FIG. 11 wherein the data formats are shown for the data transmitted on the vertical interval of the television signals between data control system 12 and addressable converter 40. As previously mentioned, the transmitted data is of two types, namely control data generated by PCS 50 and text data generated by text formatters 54 (see FIG. 2). The control data is further divided into subscriber addressing data and channel control data. The format for both the control data and the text data is shown in the form of data words in FIG. 11.

A channel control word 200 is generated by PCS 50 to define the codes required for access to each television program being transmitted. The codes identify the program to the converter of each user station so that a determination may be made as to whether the converter 40 will be enabled to process the given television signal to the television set of the user station. Channel control word 200 includes a tier code 202 defining the level of access required for the program in question. Channel control word 200 also includes a program identification code 204 to indicate whether the television program in question is a special event requiring further limitation on access by viewers to only those who have subscribed to the special event.

An eligibility code 206 defines a rating which may be assigned to many of the television programs for subject matter which may not be suitable for viewing by all parties at the user station. Finally, a descrambling code 208 is transmitted as part of channel control word 200 to provide the converter with the code necessary to operate its video descrambler unit 116. Preferably, the descrambling code 208 is generated by the video scrambler 86 of HVP unit 52 when the signal is scrambled prior to transmission.

The subscriber addressing data words includes the four words shown in FIG. 11, namely a subscriber enable word 210, and event enable word 220, an eligibility word 230 and an emergency alert word 240. These words all contain codes for controlling access of the user to the cable television system. The codes are normally originated by the subscriber at the time he begins the service and may be periodically altered by the system operator at the request of the subscriber desires. The subscriber enable word 210 includes an address code 212 which may be a single bit indicating that the word is a subscriber address word. Word 210 also includes a subscriber identification code 214 which is unique to a specific remote subscriber station. Code 214 thus identifies the subscriber enable word 210 as being appropriate only for the identified remote subscriber.

A channel enable code 216 is also included to provide bit information indicating which of the system frequency channels may be viewed by the identified subscriber at all times. Similarly, a tier enable code 218 indicates the program tiers or levels which are available for viewing by the identified user. Finally, a text enable code 219 identifies the text channels which are available for viewing by the subscriber identified in word 210.

Word 210 is transmitted as part of the data sent on the vertical interval from central data control station 12 to the converter control logic 104 shown in FIG. 6. The data transmitted in word 210 is thus used by converter control logic 104 to determine whether the converter apparatus should be enabled for processing television program signals to the television set. The subscriber enable word 210 is preferably frequently updated by the control computer 60 of PCS 50 with new data concerning the subscriber is authorized to view. This update is primarily a function of the level and type of subscription subscribed for by the user.

Event enable word 220 comprises additional enabling data sent to the converter for special events. As with word 210, word 220 includes an address code 222, and a unique subscriber identification code 224. The special event to be viewed is identified by a channel number code 226 and a program enable code 228 which together provide the data necessary for the converter to be enabled so that the user can view the special event.

The event enable word 220 is also generated by PCS 50 and transmitted to converter 40 where it is stored in converter control logic 104. Only by having the appropriate codes in logic 104 at the time that the special event is broadcast, can a subscriber view the program on the indicated channel. Thus the event enable word controls access at a particular time on a given channel during which a special event is transmitted.

Another subscriber addressing word which is used to limit access is the eligibility word 230 shown in FIG. 11. As with the other subscriber addressing words, word 230 includes an address code 232 and a subscriber identification code 234. The main parts of word 230 consist of a key numbercode 236 and an eligibility threshold code 238. Key number code 236 is a special confidential authorization code which is made known only to an authoried party at a given user station. The elibibility threshold code 238 is set by the authorized party an identifies certain eligibility codes 206 transmitted as part of channel control word 200 for certain television programs which require limited access because of the subject matter. Eligibility word 230 is also transmitted from PCS 50 to converter 40 where it is stored in converter control logic 104. When the eligibility threshold code 238 is exceeded by the eligibility code of a given television program being sent to the converter, logic 104 will disable the converter until key number 236 is input by the local keyboard 139 or the remote control unit 140.

The fourth word which is transmitted as part of the subscriber addressing data is emergency alert word 240. This word is normally transmitted only when there is an emergency for one or more user stations which requires an alert to be sent. An address code 242 identifies the word as a part of the subscriber addressing data. Word 240 also includes a subscriber identification code 244 and an emergency alert code 246. Emergency alert code 246 preferably identifies one of several different messages which may be displayed on the screen of the user station and/or one or more annunciator devices which may be activated to further alert parties at the user station.

Emergency alert word 240 is preferably generated by PCS 50 for transmission to converter 40 only if an emergency has occurred. If converter 40 receives an emergency alert word 240, the program being viewed by the user station is overridden by switching to a "home channel" for the broadcast of emergency alert messages and signals. If the television set is off, it is turned on by the converter 49 so that the emergency signals and messages may be transmitted.

The text data transmitted from text formatters 54 to converter 40 may be arranged in whatever format is suitable for transmission on the vertical interval of the television signals. Text transmission word 250 preferably includes a text identification code 252 indicating that the following data is to be treated as text. The text transmission word 250 also includes a number of text characters 254, 255, 256 and 257 for transmitting the text data. The number of characters in a given text word are optional and may be determined by the parameters of the system. Preferably, each text word has a length equivalent to a "line", that is the time it takes for the television receiver to make one horizontal scan. Using a modified ASCII code, four text characters are transmitted with each text word to provide an equivalent data rate of 240 characters per second.

Figure 12:
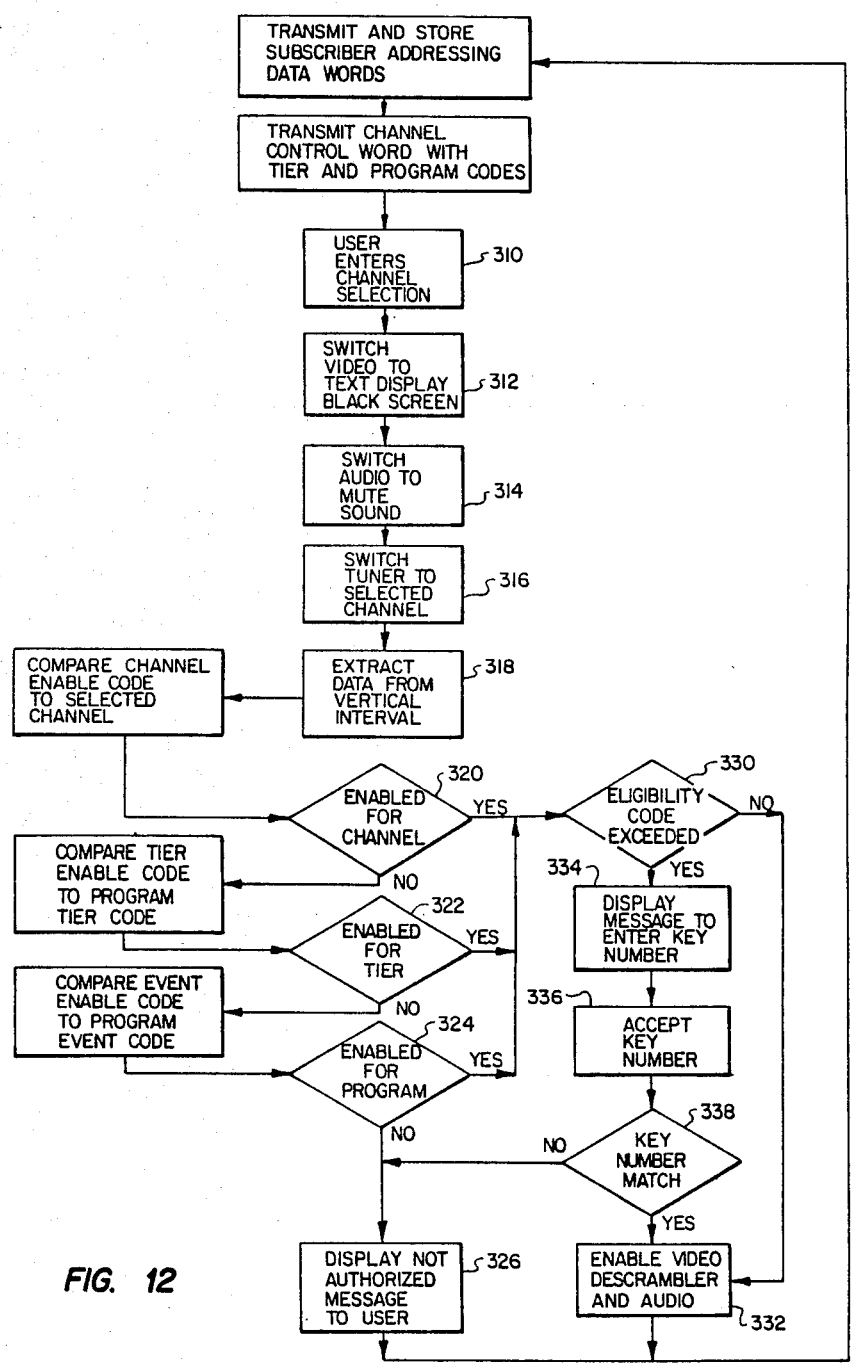
FIG. 12 is a flow diagram showing the operation of the converter shown in FIG. 6.

Referring now to FIG. 12, a flow diagram is shown describing the operation of a converter 40 in selecting a given channel and determining access to a given program. Reference should also be made to FIG. 5 for the converter components. The process begins at step 310 with the user entering a new channel number on the converter keyboard. At that point, the converter control logic implements several preparatory steps in the converter. The appropriate video switches in text/graphics generator 118 switch to a text display mode which in turn provides a black screen output to the television set. Converter control logic 104 also signals the audio level/mute control 120 to mute the sound output to the television set. Tuner 106 retunes to the requested channel and vertical interval data extractor 114 separates out the data transmitted on the vertical interval of the selected television signal.

Converter control logic 104 then makes several comparisons between the subscriber addressing data which describes the converter authorization and the channel control word which describes the required authorization for the television program currently being transmitted on the selected channel. As shown at decision step 320 of FIG. 12, a determination is made as to whether the subscriber is enabled for the selected channel. This is done by comparing the channel enable code 216 of the subscriber enable word 210 with the selected channel number. If there is no correspondence between these two codes, the next decision step 322 is taken in which it is determined whether the subscriber is enabled for the tier or level of service of the television program in question. This is determined by comparing the tier enable code 218 of subscriber enable word 210 to the tier code 202 of channel control word 200. If the compared words do not correspond, the process moves to the next decision step 324 in which a determination is made as to whether the subscriber is enabled for the television program in question with regard to the current time slot. This determination is required only if there is transmission of a special event for which an additional access clearance is needed.

If the answer is no to each of decision steps 320, 322 and 324, then the user station is not enabled for reception of the television program being broadcast on the selected channel. In that event, step 326 is taken in which the text/graphics generator 118 generates an apropriate message for display on the television screen of the user indicating that the user station is not authorized for reception of the program currently being broadcast on a selected channel. The converter control logic then cycles back to step 310 where it waits for the user to enter a new channel number.

In the event that a yes answer is received for any of the three decision steps 320, 322 and 324, converter control logic 104 proceeds with a further decision step 330. A determination is made as to whether the eligibility code threshold for the user station is exceeded by the eligibility code of the program currently on the channel number selected. This is done by comparing the eligibility code threshold 238 of eligibility word 230 to the eligibility code 206 of channel control word 200. If the threshold is not exceeded, then the converter is enabled for processing of the television signal. As shown at step 332, the video descrambler 116 is enabled to process the video signal of the selected television program and the audio level/mute control unit 120 is enabled to transmit the audio signal to the television set.

In the event that the eligibility code threshold is exceeded, converter control logic 104 takes the next step 334 which is to enable text/graphics generator 118 to generate an appropriate message for display on the television set of the user. The message instructs the user to enter his confidental key number on the converter keyboard 139 in order to enable viewing of the program in question. The entered number is then compared with the subscriber's key number as given in key number code 236 of the eligibility word 230 as indicated at decision step 338. If the key number matches with the entered number, the converter control logic 104 proceeds to the enabling step 332 as previously mentioned. If the entered number does not match with the subscriber's key number, the converter control proceeds to step 326 in which the user is informed that he is not authorized for reception of the program in question.

The foregoing procedure describes the process the converter 40 uses for authorization to process a program received on a selected channel. Similar procedures are followed by converter 40 in performing a broad spectrum of functions involving one-way and two-way interactive television and data transmission. The operation of the system of the present invention and its varied functions can best be understood by making reference to the converter keyboard 168 shown in FIG. 13.

Keyboard 168 is duplicated on the wireless remote unit 140 which is designed to control addressable converter 40 by infra-red signal transmission. The input from keyboard 168 determines the television and text outputs to be viewed by the subscriber. Converter 40 provides for tuning of up to 55 television program channels on a broad band (50–400 megahertz) cable system. It selectively processes each of these channels and outputs them individually to a standard television set on channels 3 or 4 for viewing in the home. Converter 40 and its attendant remote control unit 140 can be used as a standalone conventional CATV converter and is also upward compatible as an expansion module by a two-way interactive system.

Figure 13:
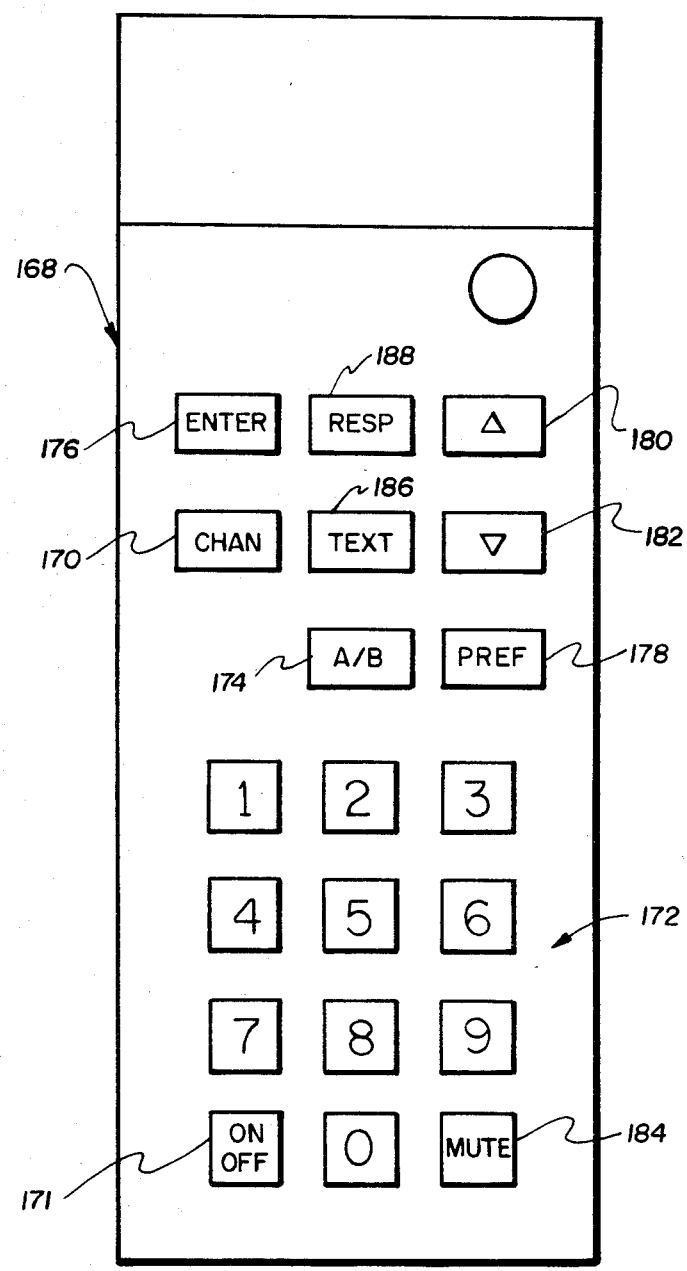
FIG. 13 is a top plan view of the keyboard of the converter of FIG. 6.

Referring now to keyboard 168 in FIG. 13, a channel is selected by pressing the CHAN key 170 on the keyboard. This action places the converter in the channel select mode so that a channel number can be entered from the numeral keys 172. For two cable systems, cable A or cable B can be selected by pressing the A/B key 174. In the normal channel select mode, channel number is recalled and displayed on the television screen each time the CHAN key 170 is pressed.

In addition to the 55 television program channels each converter unit 40 also provides for a complementary television text and graphics channel (video only) extracted from the vertical interval of the television signal transmitted in each of the 55 television program channels as previously discussed. This text displays a variety of different information such as weather, stock market quotations, continually-updated news stories, shopping information, television listings and so forth. No sound is available for the text channels other than the complementary television program channel sound which is muted if desirable.

This approach of using the vertical blanking interval for each of the 55 television program channels effectively provides up to 110 usable channels per cable for transmission of television programming and text data to the subscriber. By using the A/B key for a two cable system the number of available channels is expanded to 220 channels. Thus a vast array of textual and graphic material may be transmitted to the subscriber in addition to normal television programming.

Because of the large number of available channels, up to ten preferred channels may be stored for quick access on the converter. The channels are stored by pressing the ENTER key 176 first and then the PREF key 178 while the unit is in the channel select mode. Unit 140 will then generate the necessary signals to display the ten preferred channel assignments, if any, on the television screen. The subscriber can then enter or modify the preferred channels using the number keys and exit by pressing the CHAN key 170. Preferred channels are accessed after programming by pressing the PREF key 178. Each time the key is pressed, the converter unit 40 steps through the preferred channel table and displays the next selected channel in sequence.

Unit 140 provides for a complete volume control and sound muting by pressing the "sound up" key 180, the "sound down" key 182 or the MUTE key 184. Preferably sound is always muted for channels that have not been authorized. The sound is also muted for channels providing text and graphic programming.

For display of text and graphics information, a channel is first selected by pressing channel select key 170. To view the complementary text channel, the TEXT key 186 is pressed. Text channels can be authorized independent of the program channels so that the information may be provided as an additional service for certain subscribers while others may be available for everyone. The text information of some complementary text channels may also be formatted to supplement the television programs on its complementary program channel. For example, the textual material may amplify various new stores, shoppiing advertisements and other programming briefly presented over the television program channel. Preferably the text/graphic unit of the present invention has a capability of displaying 16 rows of 32 characters in a compact readable format. In one preferred embodiment of the present invention, text channels were formatted to contain up to ten pages of information using up to 512 alpha numeric characters, up to 3072 graphics cells or a combination of both in up to five different colors.

In addition to the one-way functions described above, the system of the present invention also provides the user with a wide variety of two-way functions which can be used in conjunction with a conventional two-way interactive system. These functions include pay-per-view premium programming, subscriber response and opinion polling, channel monitoring and test marketing, information retrieval, and home security.

The pay-per-view premium programming feature is similar to the special event limited access feature described above except no advance authorizatiion is required for the viewer as in a one-way system. For the pay-per-view feature, a channel is selected on keyboard 168. If the selected channel is a premium channel requiring additional billing, the system prints a message on the television screen requiring that the subscriber key number be entered on keyboard 168. When the key number is entered correctly, the converter requests the data control system at the head end to authorize reception of the channel. The data control system then commands the converter to allow or disallow the selected program and retains billing information for the service as required.

For the subscriber response/opinion polling feature, the subscriber tunes to a channel programmed to allow subscriber response to questions or times being viewed. Once the subscriber has familiarized himself with the transmitted program and chooses to participate, he presses the RESP key 188 at an appropriate time when opinions are solicited on the program. This action holds the selected channel and enables keyboard 168 for the entry of a numerical response using numeral keys 172. The subscriber's response is preferably displayed on the television screen. When the subscriber is satisfied with his selection, he presses the ENTER key 176 which allows the response to be transmitted to the central data control system. Using the ten numerical keys on keyboard 168, up to 100 different responses can be generated by the subscriber.

A channel monitoring and test marketing feature is also provided. Because the concept of monitoring channel viewing may not be acceptable to some subscribers, it is required that the subscriber previously give his written permission to monitor his television set. If so, converter 40 is enabled to transmit certain television set monitoring information to the central data control system. Such information preferably includes as indication that the subscriber's set is turned on, the channel it is tuned to and when the subscriber moves from one channel to another. This capability can be used for rating television programs and, in conjunction with the opinion polling capability, for test marketing of products shown on commercials or special programs. It is possible to entirely disable this function in the converter in all cases except for the per-view feature in which it is necessary to read the channel number.

The information retrieval feature allows a wide variety of information to be accessed from libraries and other data banks as the state of the art and programming services will allow. As previously mentioned, some television channels may be dedicated for interactive information retrieval to the exclusion of video transmission. The subscriber first selects the appropriate channel as previously mentioned and presses the TEXT key 186. Preferably, a message is displayed on the television screen informing the user that the channel is dedicated for interactive information retrieval. If the subscriber wishes to participate in the interactive service, he then pushes the ENTER key 176 which links the converter to a remote data bank by way of the PCS unit control computer 60. The data control system informs the subscriber converter of the time slot during which data for its use would appear. The converter than displays data directed to it by the information computer. Preferably, the subscriber interacts through his keyboard and a "tree search" to obtain the information he desires.

With reference to FIGS. 14–17 another preferred embodiment of the present invention is shown. In the system shown therein, a data transmission system is disclosed for the transmission of data in portions of the video field in addition to the vertical interval portion. This type of data transmission over a substantial portion of the video field is referred to herein as full-channel or full-field data transmission. This data can be control data or textual or graphic data for visual display, called "teletext" data. The data transmitted in this system is formatted in the line or video format shown in FIGS. 2B and 11, in order to simplify the need for additional transmission and reception equipment as compared to the previously described system of the present invention. The data to be transmitted is encoded at the head end in the video format shown on FIG. 2B for a substantial number of lines in the entire video field.

Figure 14:
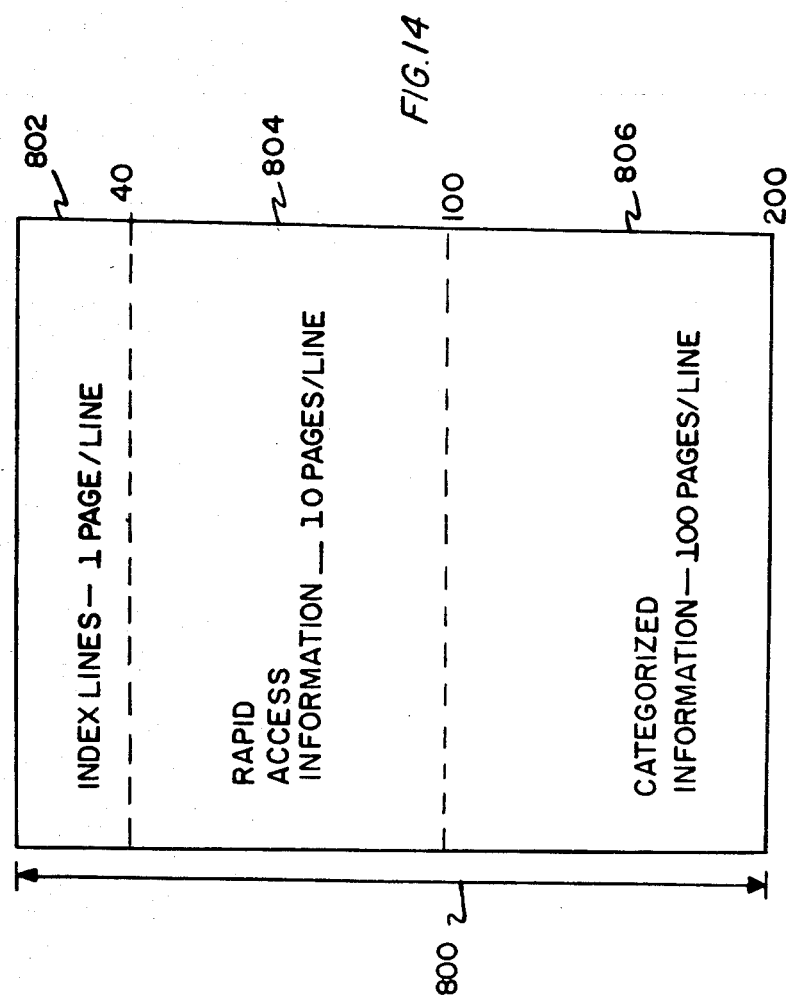
FIG. 14 is a diagram showing a video layout for full-channel teletext data transmission in accordance with another embodiment of the present invention.

As shown in FIG. 14, a preferred approach is to encode approximately 200 lines of the total 262.5 lines in the video field as a portion 800 for transmission of teletext data. Each data line contains one or more "pages" of text, each page being a full display field shown on a user television terminal. The 92 bit data packet shown in FIG. 2B is preferably transmitted for each line in about 53 microseconds. Approximately 64 transmissions of this data line are required to provide enough information to load the text graphics display at the converter and so as to fill a display field on a television screen. Thus, the system of the present invention preferably can transmit approximately one page each second on each line of video formatted data. One or more pages is sequentially transmitted on each line to provide the desired page capacity and access time, depending upon the importance of rapidly accessing the information for each page.

As an example, in FIG. 14, the first 40 lines in the transmission portion of the video field are preferably index lines 802 containing index information about the other lines in the field. In this preferred embodiment, only one page is transmitted per line in order to provide access to each index page with a maximum of one second delay time. Lines 41 to 100 are rapid access information lines 804 in which frequent but not instantaneous repetition of information is needed. For such information, ten pages may be sequentially repeated on each line. In that case, the maximum waiting time for a given page is about ten seconds with an average waiting time of about five seconds. Typical of the type of information transmitted on these rapid access information lines is the airline guide and movie review text data.

In the example of FIG. 14, lines 101 through 200 are preferably provided for categorized information 806 which does not normally require rapid repetition and which can be accessed at any point in the categorized information display. Preferably, such categorized information would be repeated at the rate of about 100 pages per line. Typical information of this type would include classified advertising data. Thus, the example of FIG. 14 would provide 40 index pages, 600 rapid access information pages, and 10,000 categorized information pages, or a total page capacity of 10,640 pages. Of course, page capacity could be higher or lower depending upon the information service applications for the channel.

Figure 15:
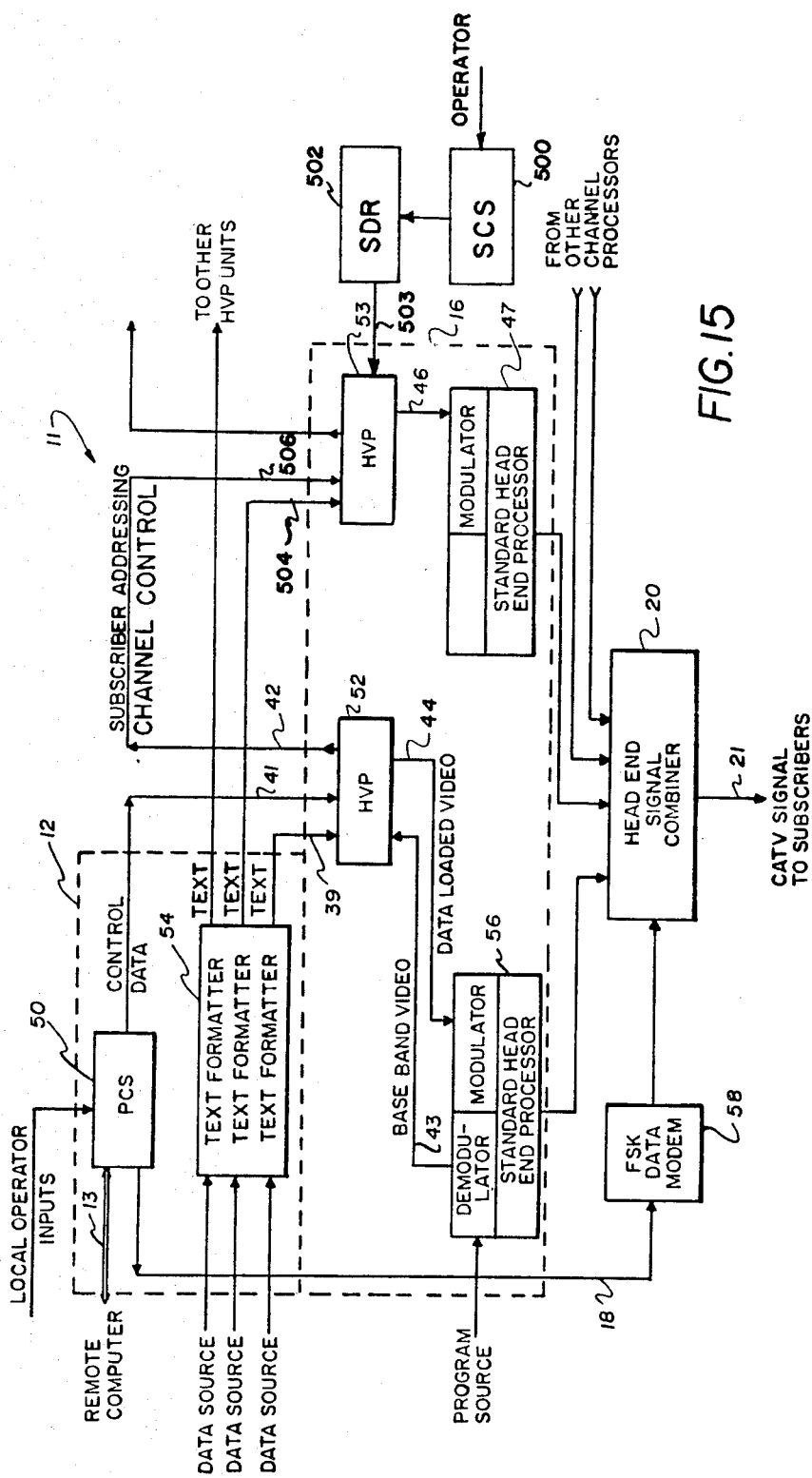
FIG. 15 is a block diagram for the preferred embodiment of FIG. 14 of the head end portion of the system shown in FIG. 1.

Referring now to FIG. 15, a preferred embodiment of the head end apparatus of FIG. 1 for providing full-channel teletext is shown in greater detail. The preferred embodiment of FIG. 15 is substantially the same as that shown in FIG. 2 for the head end apparatus in the vertical interval data transmission system. Accordingly, the same reference numbers are used for the elements which are identical to those shown in FIG. 2. New or modified reference numerals are used only for those units which are modified in the full-channel teletext embodiment shown.

It should be apparent that it is possible to have head end equipment transmitting video signals with data loaded only in the vertical interval working side by side with other head end equipment using a full-channel data format. As shown in FIG. 15, the head end video processor 52 and its associated units have not been modified and are formatted to output a video signal having data loaded in the vertical data.

Likewise, HVP 53 and its associated units and inputs have not been substantially changed except in one respect. Rather than having a satellite program or other type of video program input on line 45, data is continually transmitted to HVP 53 on that line. This data is transmitted just as if it were a video signal but in fact is instead binary digital information as described with respect to FIG. 2B. This full channel data input is provided by a selective data retrieval (SDR) processor 502, which in turn is driven by a screen composition system (SCS) 500 under operator programming. SDR 502 provides full-channel teletext data formatted in the video line format shown in FIG. 2B. It also determines the number of pages which are to be transmitted for each video line and the sequential timing for transmission of these pages. SDR 502 will be discussed in more detail hereafter.

The screen composition system 500 is a separate processor unit which enables the preparation and input of new data to SDR 502. The data preparation accomplished by SCS 500 is preferably done under the control of one or more operators which load the data in the appropriate page format and preview each page before processing the data to SDR 502. SCS 500 will be discussed in more detail hereafter.

It should be noted that, in full-channel teletext transmission, a vertical interval still exists which is utilized by the HVP to transmit a separate vertical interval teletext channel. Thus, HVP 53 receives vertical interval formatted text data and subscriber address and control data, on lines 504 and 506 respectively, just as does HVP 52. This data is injected in the vertical interval by HVP 53 in the same manner as shown in FIGS. 4 and 5 with respect to HVP 52. The major difference for HVP 53 is that it transmits full text data for the viewable video channel instead of video data as is done by HVP 52.

Figure 16:
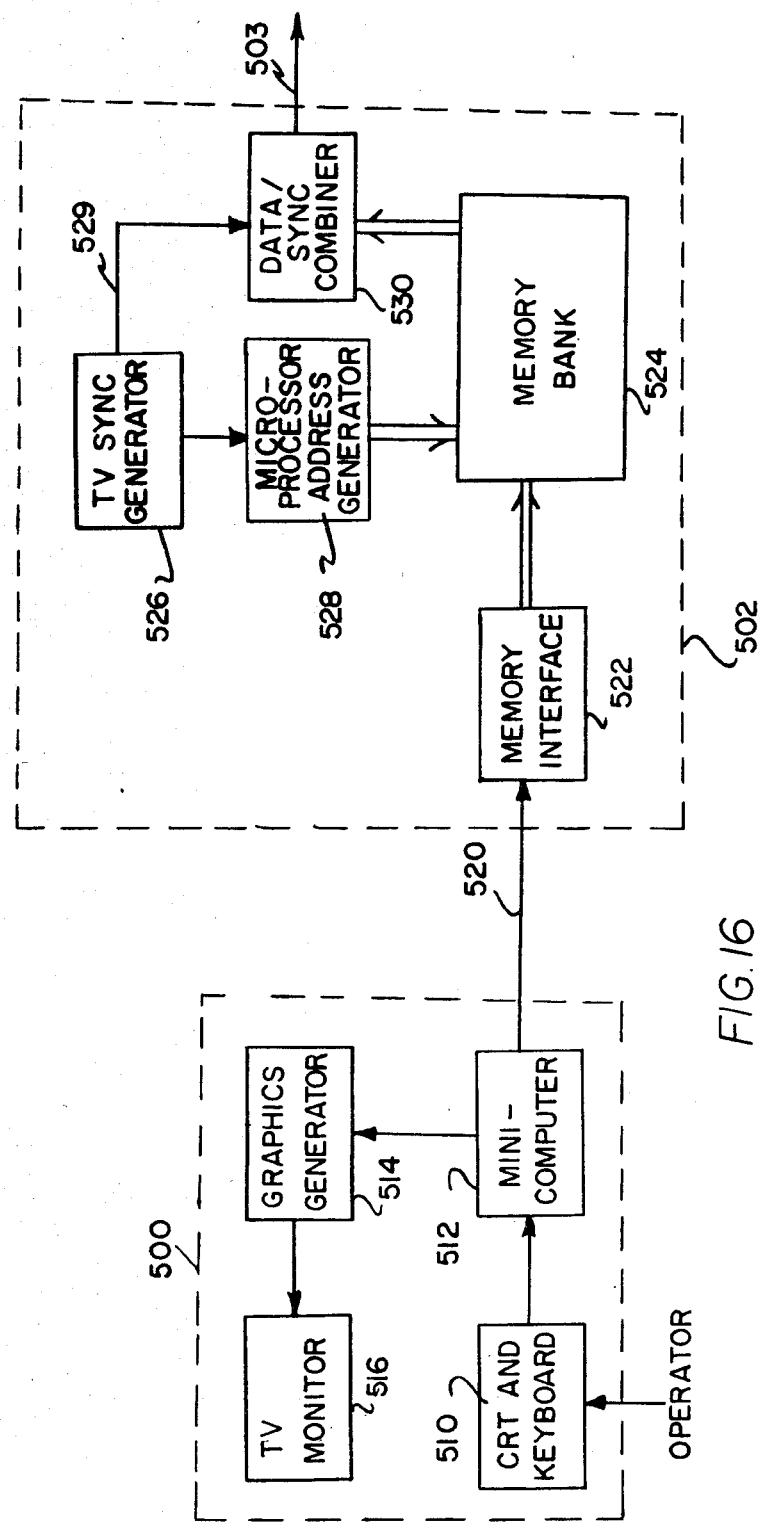
FIG. 16 is a block diagram of the screen composition system and selective data retrieval system shown in FIG. 15.

Referring now to FIG. 16, the screen composition system 500 and selective data retrieval processor 502 are shown in greater detail. SCS 500 is basically an interactive operator work station that creates screen pages which will ultimately be displayed to a user of the system. SCS 500 may be any conventional screen composition system which is compatible with the system of the present invention. Its main function is to compose the incoming data into a page-type format for use by the rest of the system.

By way of illustration, SCS 500 preferably includes one or more work stations 510 each comprising a CRT terminal with keyboard 510 for inputting data into an appropriately programmed minicomputer 512. A graphics generator 514 is connected to an output of minicomputer 512 for displaying on TV monitor 516 the data base as it is composed by one or more operators. Minicomputer 512 may be any conventional general-purpose computer which is compatible with the system of the present invention, such as the HP 1000 computer. Graphics generator 514 is preferably a converter of the type shown in FIG. 6, adapted to utilize special non-subscriber lines to transmit the display data to TV monitor 516 for previewing prior to loading each page into the SDR processor for subscriber access.

Once the data base for each page is appropriately formatted, it is transmitted to SDR 502 by way of a data link 520 in serial format. Preferably, the data is transmitted in RS 232 format to SDR 502. Data link 520 inputs the serial data from microcomputer 512 to a memory interface circuitry 522 which converts the data to a parallel format and loads the data into a memory bank 524. Memory interface 522 also assigns an address for each unit of data received from SCS 500 and loads the data unit into that address in memory bank 524. Memory bank 524 builds the complete data base from which transmissions are made to HVP 53. Memory bank 524 simply stores each data unit, preferably a page, at a given assigned address for retrieval and transmission to the rest of the system. Preferably, memory bank 524 has a storage capacity of at least 10,640 pages, each page consisting of 512 characters. Preferably, memory interface unit 530 is a conventional microprocessor chip such as Intel chip 8048 made by Intel Corporation. Memory bank 524 is preferably a general-purpose memory system, such as the MK 8600 general-purpose memory system made by Mostek Corporation.

A TV sync generator 526 generates the conventional horizontal sync pulses and color burst pulses shown in FIG. 2B. These pulses are transmitted to a data/sync combiner unit 530 to provide the necessary timing signals for combiner unit 530. Combiner unit 530 uses the timing signal from TV sync generator 526 to time the transmission of data pages out of memory bank 524 in accordance with the assigned addresses of those pages and to build a base band video format signal on line 503 of the type shown in FIG. 2B. Thus, the analog timing signals are developed by TV sync generator 526 and combine with the digital page data from memory bank 524 to provide the video formatted data transmission signal on line 503.

TV sync generator 526 also provides timing pulses to a microprocessor address generator 528 which coordinates the transmission of data pages out of memory bank 524. Address generator 528 simply maintains a set of tables listing the memory address of each page of data and the video line and location on which it is to be transmitted. Thus, generator 528 determines the sequence of page data information to data/sync combiner 503.

TV sync generator 526 is preferably a conventional generator such as the MM 5321 unit made by National Semiconductor Corporation. The microprocessor address generator 528 is preferably an appropriate microprocessor such as the Intel 8048 chip. Data/sync combiner 530 is also a conventional unit, such as the 1461 Insertion Test Signal Generator Deleter/Inserter made by Tektronix Corporation.

The foregoing description describes the changes which are necessary with regard to the head end processors in order to establish a full-channel teletext transmission system. At the converter end of the system, preferably no changes are required. Thus, the addressable converter shown in FIG. 6 of the first preferred embodiment described herein is likewise also completely compatible for a full-channel teletext transmission. Referring briefly to FIG. 6, a data extractor 114 functions to provide data on any designated lines including the vertical interval data. Preferably, no circuitry changes are required since the data is automatically extracted at all times and is only intercepted by converter control logic unit 104 when it is commanded to do so. Thus, the beauty and simplicity of the present invention using full-channel teletext is readily apparent since separate expensive receivers and other equipment normally used in conventional channels dedicated to data transmission are not required in the system of the present invention.

Figure 17:
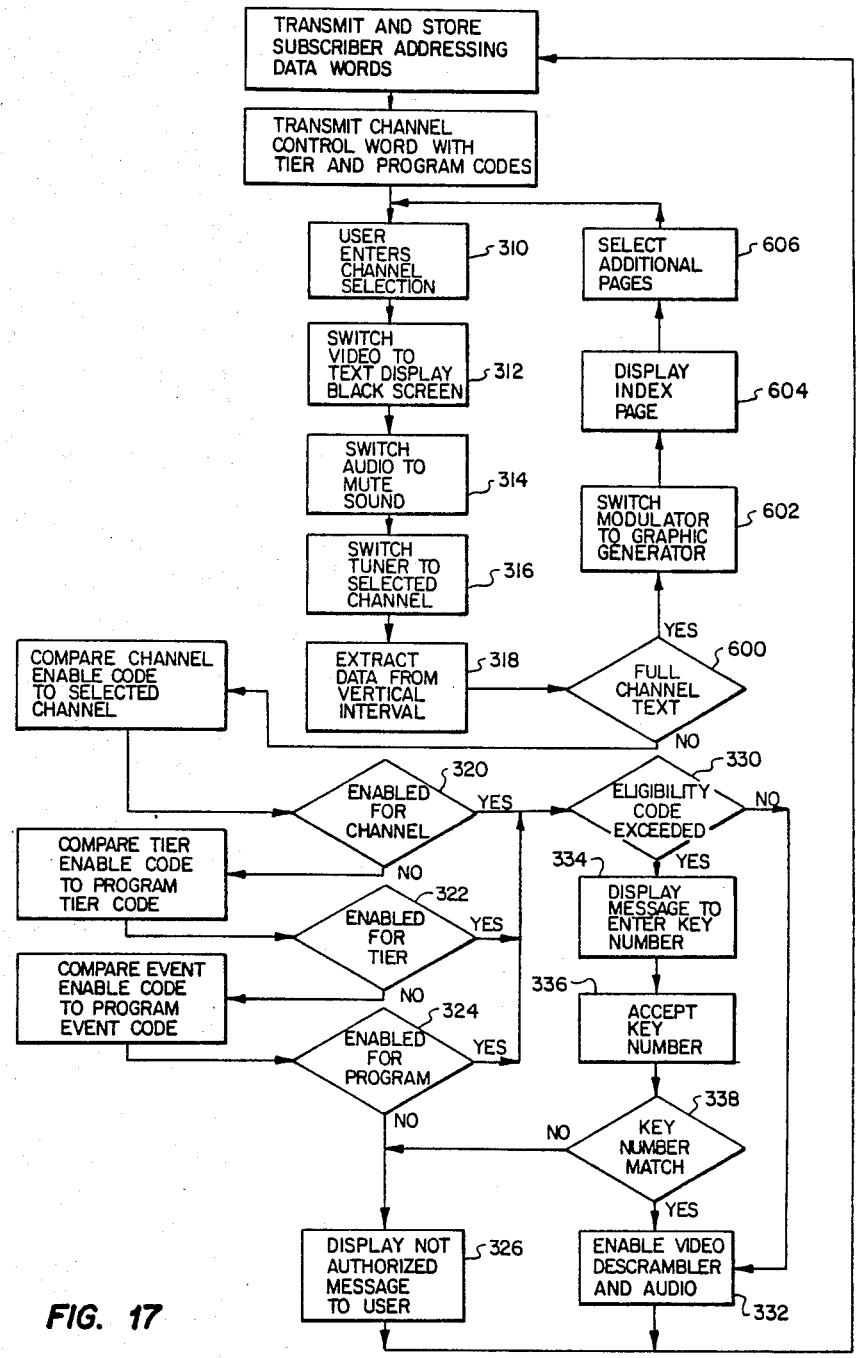
FIG. 17 is a flow diagram showing the operation of the converter shown in FIG. 16 operating in conjunction with the head end of FIG. 15.

Looking at the flow diagram of FIG. 17 for full-channel teletext, a few additional steps must be added to the flow diagram of FIG. 12 showing the operation of the first preferred embodiment. After the data is extracted from the vertical interval at block 318, to control identifier 201 of channel control word 200 (see FIG. 11) is checked to determine whether the signals being transmitted are in video or text format. If the signals are in video format, the procedure moves to decision block 320 as has been previously discussed.

If the control word indicates that the signals being transmitted are in full-channel text format, logic unit 104 (shown in FIG. 6) simply switches channel ¾ modulator 134 to the text/graphics generator 118 and holds it there for the entire channel transmission. The display memory 130 is then filled with appropriate data from converter control logic unit 104 which is formatted by generator 118 and transmitted by modulator 134 for display on the user television set.

As discussed earlier, one of the advantages of the present system is that a relatively slow converter system can be used for selecting and displaying text data even though the rate of transmission of all teletext data when full channel transmission is used may be much higher. The key to this approach is that the user's converter need only select, process and display data from a single line at a given time in order to obtain the desired text information, since the information is formatted by pages and is indexed according to the video field lines discussed previously. Preferably, an initial index page or pages are displayed automatically to the user as shown at block 604 in FIG. 17 in order to provide him with the information for further selections from the full text channel to which the converter is tuned. Once the user selects additional pages, as shown at block 606 in FIG. 17, the appropriate line or lines are accessed by converter control logic unit 104 and the selected page or sequence of pages are loaded into display memory 130 for display to the user.

Thus, the user is provided with a vast amount of data transmitted at high speeds over the entire video field, for example, at data rates of as high as 1.7 megabaud (bits per second). However, the user requires only the same low speed equipment utilized by a converter having vertical interval data capabilities in the ten kilobaud range. The user equipment simply ignores all of the text data transmitted except for the given line on which the desired text is located. Only that line or portion of a line is extracted and decoded for text viewing by the user.

Thus, for example, if a seven digit number were used for addressing each page in the full field text data, the first three digits might be utilized to designate the line number. The next two digits could designate the category number on a particular line and the last two digits would be used to designate an exact page requested from that category. Thus, the converter control logic would simply step down through the lines of data being transmitted, locate the appropriate category and page on a given line and then collect the data from that line for the display memory 130.

As can be seen from the foregoing, the system of the present invention provide numerous important advantages over the prior art. The present invention enables the use of a one-way cable television system to be used for a variety of sophisticated functions which previously would only have been accomplished using two-way interactive cable systems. The present invention enables the control of user access to the cable television system based on several different parameter, including television channel, tier of television service, special event and eligibility based on television program content. Other parameters may also be used to limit access within the scope of the present invention.

The present invention also provides for the transmission of data, including both control data and text data, on the vertical interval of the television program signals. This format may be used for all channels, thus providing a substantial transmission of text data which would otherwise have required one or more dedicated data channels for transmission. Moreover, by transmitting the data in the VI "line" format, the television program transmission and receiver apparatus may be utilized for data transmission as well.

Another advantage of the present invention is the procedure for inserting the data on the vertical interval using a reference level in the vertical interval so as to minimize errors which might otherwise occur through a shift in the DC level of the interval. The present invention also provides a very flexible data transmission system which enables the transmission of different types of data, each having its own identification type as part of the data format. This approach eliminates the need for upstream inquiry by the remote data receivers.

The present invention also provides a system for the transmission of full-channel text data at high baud rates without requiring expensive additional apparatus at the user terminals other than that which is used in connection with the reception of text data on the vertical interval. Relatively few apparatus changes are required at the head end in order to provide full channel teletext transmission, and those costs are fixed regardless of how many subscribers use the service. Moreover, the present invention enables the transmission of teletext data in a one-way system with relatively low access time which is not dependent on the number of users. All subscribers can access and receive the same information simultaneously with no access time degradation.

The present invention includes a versatile converter unit at each remote user location which controls access as described above and interfaces with the user in a variety of applications. To assist in this interface a graphics generator provides graphic display signals which are presented to the user on the television receiver. The user is thereby guided as to the channel being viewed, the input necessary in order to overcome certain access limitations, emergency messages and the procedure required for making a subscriber response or information retrieval in two-way systems. In addition, the same graphics generator unit is used for providing the display signals for presenting the text data on the television receiver. The converter also is provided with a two-way subscriber control bus which can interface with a home terminal unit which in turn is part of a two-way interactive data acquisition and control system.

Another important advantage of the present system is the use of a versatile keyboard at each converter unit which interfaces with the converter logic and the graphics display unit to enable the user to interface with the converter in a number of different modes. The converter also includes a number of special features such as an emergency feature which recognizes an emergency alert signal from a central station and executes an emergency procedure even if the set is turned off at the time. Moreover, the remote unit is designed to interface with the converter by an infra-red wireless signal with the same flexible keyboard used on the converter. Access between the cables of a dual cable system is accomplished electronically by means of a special switch on the keyboard.

While there have been described what are at present considered to be preferred embodiments of the present invention, it will be obvious to those skilled in the art that various changes and modifications may be made therein without departing from the invention, and it is therefore intended to cover all such changes and modifications as falls in the spirit and scope of the invention.

What is claimed is:

1. In a television communications system having a central station for transmitting a plurality of television signals at different frequency channels to a plurality of user stations remote from said central stations, each having a tuner for selecting one of said television signals, a method of utilizing said central station to limit access of said user stations to only certain ones of said television signals, comprising:

generating a plurality of category codes at said central station to limit user access to predetermined categories of said television signals, one of said category codes being generated for each user station, each said category code including predetermined enabling data required by the central station for said user station to access said predetermined categories of television signals;

transmitting each of said category codes from the central station to its respective user station to precondition each user station by authorization from the central station to selectively access said predetermined categories of television signals;

generating a plurality of program codes at said central station to limit user access to said predetermined categories of television signals, one of said program codes being generated for each television signal, each of said program codes including predetermined control data for enabling access to one of said television signals;

transmitting one of said program codes with each of said television signals to each of said user stations being tuned to receive one of said television signals;

comparing the control data of said program code to the enabling data of the category code provided by the central station to each user station; and enabling only each user station which has a category code with enabling data corresponding to the control data of said program code, whereby said enabled user station can receive and process any said tuned television signal within a predetermined category of said television signals corresponding to said category code.

2. The method of claim 1 wherein the access criterion corresponds to a predetermined frequency channel.

3. The method of claim 1 wherein the access criterion corresponds to a predetermined tier of service regardless of frequency channel.

4. The method of claim 1 wherein the access criterion corresponds to a given program on a given frequency channel.

5. The method of claim 1 wherein the access criterion corresponds to the type of subject matter of a given program on a given frequency channel.

6. The method of claim 1 and further comprising the steps of generating a graphics display signal for those user stations having user codes not corresponding to said program code.

7. The method of claim 6 and further comprising the step of presenting a message on said television set in response to said graphics display signal to indicate that access to said one television signal is not enabled for said user station.

8. The method of utilizing a central station to limit remote user access to a plurality of cable television signals each transmitted at a different frequency channel on a cable plant from said central station to a plurality of user stations remote from said central station, each having a tuner for selecting one of said television signals, comprising:

generating a plurality of category codes at said central station to limit user access to predetermined categories of said television signals, each category code being representative of the access criteria required for one of said user stations to receive said predetermined categories of television signals, each said category code including a channel enable code representative of the frequency channels of said television signals to which said user station is authorized for access, a tier enable code representative of a user level at which said user station is authorized for access to said television signals, and a program enable code representative of a predetermined time at which said user station is authorized for access to one of said television signals;

transmitting each of said category codes from the central station to its respective user station;

storing each of said category codes at said respective user station;

generating a plurality of control codes at said central station to limit user access to said predetermined categories of television signals, each control code being representative of the access criteria required for said user stations to receive one of said television signals, said control code having a tier code representative of a user level required for access to said one television signal and a program code representative of user access to a given program transmitted by said television signal at a predetermined time;

transmitting said control code to each user station tuned to said television signal;

comparing said control code of the tuned television signal to the category code of said user station provided by the control station, including comparing the channel enable code to the channel frequency of said tuned television signal, comparing the tier enable code to the tier code of the tuned television signal, and comparing the program enable code to the program code of said television signal; and enabling said user station to access to said tuned television station in response to the channel enable code corresponding to the tuned channel, of the tier enable code corresponding to the tier code, or the program enable code corresponding to the program code.

* * * * *

UNITED STATES PATENT AND TRADEMARK OFFICE
CERTIFICATE OF CORRECTION

PATENT NO. : 4,536,791

DATED : August 20, 1985

INVENTOR(S) : John G. Campbell, Carl F. Schoeneberger, Allan B. Bundens, Richard M. Fogle, and John R. Lemburg It is certified that error appears in the above-identified patent and that said Letters Patent is hereby corrected as shown below:

Column 7, line 48, "viedo" should be --video--.

Column 14, line 49, "49" should be --40--.

Column 17, line 32, "stores, shoppiing" should be --stories, shopping--.

Column 17, line 67, "times" should be --items--.

Signed and Sealed this

Twelfth Day of November 1985

[SEAL]

Attest:

Attesting Officer

DONALD J. QUIGG

Commissioner of Patents and Trademarks